(12) United States Patent
Nishiguchi et al.

(10) Patent No.: US 10,763,999 B2
(45) Date of Patent: Sep. 1, 2020

(54) WIRELESS COMMUNICATION SYSTEM AND METHOD

(71) Applicant: FUJITSU LIMITED, Kawasaki-shi, Kanagawa (JP)

(72) Inventors: Naoki Nishiguchi, Kawasaki (JP); Tatsuro Matsumoto, Yokohama (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 16/108,313

(22) Filed: Aug. 22, 2018

(65) Prior Publication Data
US 2019/0097764 A1    Mar. 28, 2019

(30) Foreign Application Priority Data

Sep. 22, 2017    (JP) .................................. 2017-182134

(51) Int. Cl.
  *H04L 1/18*     (2006.01)
  *H04W 4/021*    (2018.01)
  *H04W 4/80*     (2018.01)
(52) U.S. Cl.
  CPC ............ *H04L 1/1819* (2013.01); *H04L 1/189* (2013.01); *H04L 1/1809* (2013.01); *H04L 1/1874* (2013.01); *H04W 4/021* (2013.01); *H04W 4/80* (2018.02)
(58) Field of Classification Search
  CPC ... H04L 1/1819; H04L 1/1874; H04L 1/1809; H04L 1/189; H04W 4/80; H04W 4/021
  See application file for complete search history.

(56) References Cited

U.S. PATENT DOCUMENTS

| 2016/0127875 | A1* | 5/2016 | Zampini, II | .......... | G01S 5/0226 |
| | | | | | 370/311 |
| 2016/0302036 | A1* | 10/2016 | Chan | ........................ | H04W 4/80 |
| 2016/0323754 | A1* | 11/2016 | Friday | .................... | H04W 16/28 |
| 2017/0127336 | A1* | 5/2017 | Kang | .................... | H04B 17/318 |
| 2017/0273008 | A1* | 9/2017 | Friday | .................... | H04W 16/28 |
| 2019/0090228 | A1* | 3/2019 | Zhang | ............... | H04W 72/1226 |

FOREIGN PATENT DOCUMENTS

| JP | 2007-201921 | 8/2007 |
| JP | 2008-011038 | 1/2008 |
| JP | 2008-281490 | 11/2008 |
| JP | 2009-017217 | 1/2009 |
| JP | 2016-217858 | 12/2016 |
| JP | 2016-220150 | 12/2016 |

\* cited by examiner

*Primary Examiner* — Fahmida S Chowdhury
(74) *Attorney, Agent, or Firm* — Fujitsu Patent Center

(57) ABSTRACT

A wireless communication system includes a first wireless device configured to transmit a first signal including first information, a plurality of second wireless devices each of which is configured to receive the first signal and to transmit a second signal including the first information based on the first signal, and a third wireless device configured to transmit a third signal which requests transmitting of the second signal when third wireless device receives neither the first signal nor the second signal, wherein each of the second wireless devices is configured to transmit the second signal when the third signal is received and the second signal is not received from another second wireless device, and each of the second wireless devices is configured not to transmit the second signal even when the third signal is received, when the second signal is received from another second wireless device.

16 Claims, 22 Drawing Sheets

FIG. 12A

| REGISTRATION RULE INFORMATION ⌐61 | UUID ⌐62 | major ⌐63 |
|---|---|---|
| NOTIFICATION RULE INFORMATION | 10000000000000000000000000000000 | - |
| SENDING REQUEST RULE INFORMATION | 10000000000000000000000000000000 | 1 |

FIG. 12B

| DETECTION OBJECT ⌐64 | UUID ⌐65 | major ⌐66 | minor ⌐67 |
|---|---|---|---|
| 4a | 0000000000000000000000000000000A | 1 | 1 |
| 4b | 0000000000000000000000000000000B | 1 | 1 |
| 4c | 0000000000000000000000000000000C | 1 | 1 |

FIG. 13A

RULE

| DETECTION OBJECT (64) | UUID (65) | major (66) | minor (67) |
|---|---|---|---|
| 4a | 0000000000000000000000000000000A | 1 | 1 |
| 4b | 0000000000000000000000000000000B | 1 | 1 |
| 4c | 0000000000000000000000000000000C | 1 | 1 |

FIG. 13B

NOTIFICATIONS

| DETECTION OBJECT (75) | UUID (76) | major (77) |
|---|---|---|
| 4a | 10000000000000000000000000000000 | 2 |
| 4b | 10000000000000000000000000000000 | 3 |
| 4c | 10000000000000000000000000000000 | 4 |

WIRELESS COMMUNICATION SYSTEM AND METHOD

CROSS-REFERENCE TO RELATED APPLICATION

This application is based upon and claims the benefit of priority of the prior Japanese Patent Application No. 2017-182134, filed on Sep. 22, 2017, the entire contents of which are incorporated herein by reference.

FIELD

The embodiment discussed herein is related to a wireless communication system and a method.

BACKGROUND

With the spread of mobile terminals that are capable of performing data communication in a wireless manner, the provision of services that use identification information on a wireless station such as a beacon is progressing. For example, an owner of a restaurant places a beacon in his/her restaurant, and causes the beacon to transmit identification information on the beacon at fixed intervals. A user of a mobile terminal approaches the restaurant accordingly to receive a wireless signal including the identification information that is transmitted from the beacon. The mobile terminal is capable of acquiring coupon information on the restaurant based on the wireless signal including the identification information that is received from the beacon.

To specify a detection object such as the beacon corresponding to the detected identification information, the mobile terminal allows an identification information list of detection objects related to identification information to be specified to be previously registered in the mobile terminal. Because the detection object includes unique identification information, the mobile terminal is capable of specifying a detection object corresponding to the detected identification information by verifying the detected identification information against the identification information list that is previously registered in the mobile terminal. For example, a method in which a mobile terminal and other mobile terminals each of which is able to execute a short-distance communicate with the mobile terminal are grouped, and only the mobile terminal in the group is communicable with a server is disclosed. Related techniques are disclosed in Japanese Laid-open Patent Publication Nos. 2008-011038, 2009-017217, 2007-201921, 2016-220150, 2016-217858, and 2008-281490.

SUMMARY

According to an aspect of the invention, a wireless communication system includes a first wireless device configured to transmit a first signal including first information, a plurality of second wireless devices each of which is configured to receive the first signal and to transmit a second signal including the first information based on the first signal, and a third wireless device configured to transmit a third signal which requests transmitting of the second signal when third wireless device receives neither the first signal nor the second signal, wherein each of the second wireless devices is configured to transmit the second signal when the third signal is received and the second signal is not received from another second wireless device, and each of the second wireless devices is configured not to transmit the second signal even when the third signal is received, when the second signal is received from another second wireless device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 12A and 12B illustrate concrete examples of rule information;

FIGS. 13A and 13B illustrate concrete examples of notification information corresponding to rule information;

DESCRIPTION OF EMBODIMENT

A beacon is typically fixedly placed to an architecture, the ground, or the like, and the range (coverage area) where a mobile terminal is capable of receiving a wireless signal from the beacon is limited to the range where a wireless signal from the beacon may reach. Accordingly, it may be considered that a plurality of beacons is placed to make a coverage area wider. Herein, it is assumed that when beacons are sparsely placed in a desired coverage area, a wireless terminal is incapable of reliably receiving a wireless signal from the beacon due to the generation of a so-called coverage hole and the like, although the number of requested beacons may be reduced. In contrast, when beacons are densely placed in a desired coverage area, although the generation of a coverage hole may be reduced, the number of requested beacons increases, a problem remains in terms of cost and the like.

Figure 1:
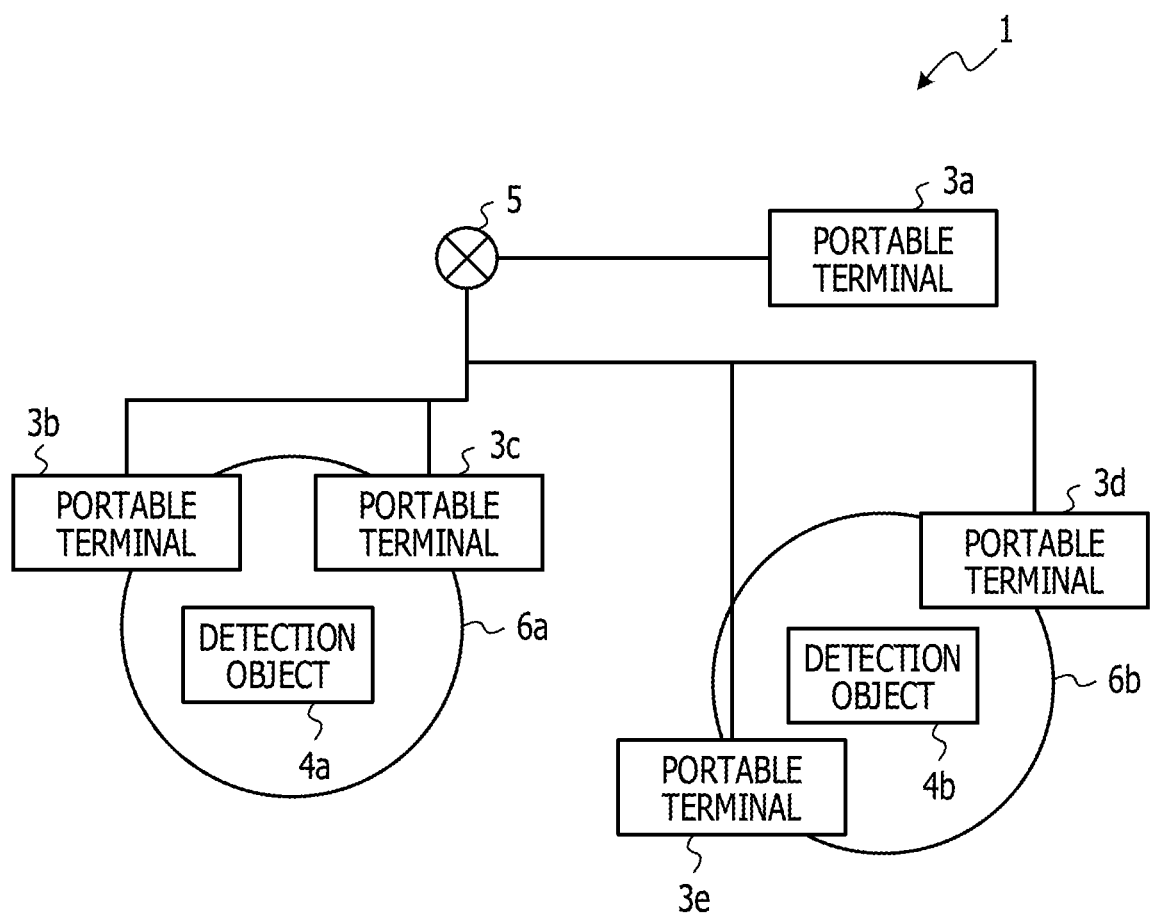
FIG. 1 is one example of an information processing system.

FIG. 1 is one example of an information processing system. In FIG. 1, an information processing system 1 includes a mobile terminal 3 (hereinafter, also called simply terminal 3), a detection object 4, and a network 5. The information processing system 1 is one of information processing systems that process and manage identification information.

The mobile terminal 3 is a wireless terminal such as a mobile telephone or a smartphone that allows data communication. The mobile terminal 3 is basically a mobile wireless terminal that is assumed to be moved by being carried by a person. In the information processing system 1, as one example, the mobile terminal 3 includes mobile terminals 3a to 3e. The detection object 4 is a wireless station that sends position information and the like with unique identification information by using a wireless signal. The detection object 4 is, for example, a beacon that wirelessly transmits a wireless signal (referred to as beacon signal) to which information is previously set, at a fixed cycle, and is basically a fixed wireless station that is assumed to be fixedly placed on an architecture, the ground, or the like. The beacon signal includes, for example, identification information for identifying each detection object, placement position information indicating a position at which a detection object is placed, the transmission time of the beacon signal, and the like. The detection object 4 may be, in addition to the beacon, a near field communication (NFC), a quick response (QR) code, WiFi, or the like. Although, as is described later, an area 6 is defined as the range in which signals sent from the detection object 4 are capable of being received, for example, an area that is allocated for detecting a GPS signal may be set as a detection object.

In the information processing system 1, the detection object 4 includes detection objects 4a and 4b. Furthermore, in FIG. 1, areas 6a and 6b are respectively ranges in which the mobile terminals 3 are capable of receiving beacon signals transmitted from the detection objects 4a and 4b. In the case of FIG. 1, the mobile terminals 3b and 3c are present in the area 6a where the mobile terminals 3b and 3c are capable of receiving beacon signals transmitted from the detection object 4a, and the mobile terminals 3d and 3e are present in the area 6b where the mobile terminals 3d and 3e are capable of receiving beacon signals transmitted from the detection object 4b. Each of the mobile terminals 3 is coupled to the network 5 in a wired or wireless manner.

The identification information transmitted by the detection object 4 is, for example, in a case of iBeacon, such information that a major number and a minor number are assigned to a universally unique identifier (UUID) that is defined by the RFC4122 standard. Each detection object 4 includes a unique UUID. The mobile terminal 3 is requested to register beforehand identification information on the detection object 4 that the mobile terminal 3 intends to detect to the self OS, in order to detect a signal distributed by the detection object 4.

The identification information on the detection object 4 that the mobile terminal 3 desires or assumes the detection is allocated to the mobile terminal 3 before the mobile terminal 3 enters into a placement area of the information processing system 1. The identification information on the detection object 4 is allocated to the mobile terminal 3, as is described later, for example, due to the control by an application installed in the mobile terminal 3.

At least a part of the mobile terminals 3 in the present embodiment is capable of acting as a beacon that is the detection object 4 (falsely pretending as a beacon). In other words, when the mobile terminal 3 satisfies a predetermined condition, the mobile terminal 3 acts as a beacon that is the detection object 4, and performs transmission of a beacon signal (referred to as virtual beacon signal) including identification information on the detection object 4. This makes it possible to suppress the number of beacons that are the detection objects 4, and to cover a wide area while generation of a coverage hole being suppressed.

Further, when all the mobile terminals 3 that are capable of acting as the detection objects 4 act as the detection objects 4, the enormous amount of virtual beacon signals sent from the mobile terminals 3 in addition to the beacon signals sent from the detection object 4 may interfere reception of the beacon signals. As one solution to solve this problem, collective management about which mobile terminal 3 acts as which detection object 4 and the like may be considered. However, a server or the like for the collective management is requested to be placed in this case, which remains the problems about the cost and the operation.

Therefore, requested is a mechanism that allows the mobile terminal 3 that is capable of acting as the detection object 4 to flexibly send out a beacon signal while keeping moderation, without executing the collective management by the server or the like.

At least a part of the mobile terminals 3 in the present embodiment includes a function of, when being incapable of detecting the detection object 4 (when being incapable of receiving a beacon signal from the detection object 4), making a sending request of a virtual beacon signal with respect to another mobile terminal 3. As the terminal 3 having a function of making a sending request, for example, a comparatively low-level (low functionality) terminal 3 is assumed. In contrast to this, as the mobile terminal 3 that is capable of acting also as the detection object 4 described above, for example, a comparatively high-level (high functionality) terminal 3 is assumed.

The mobile terminal 3 having a function of making a sending request transmits a sending request that requests sending of a virtual beacon signal with respect to another mobile terminal 3. The mobile terminal 3 having received a sending request signal starts transmission of a virtual beacon signal. The mobile terminal 3 that receives a virtual beacon signal sent from another mobile terminal 3 after having received a sending request signal and before sending a self virtual beacon signal does not send a virtual beacon signal.

As in the foregoing, the information processing system 1 according to the embodiment is capable of managing sending statuses of virtual beacon signals of the respective mobile terminals 3, without depending on the sever for the collective management.

Figure 2:
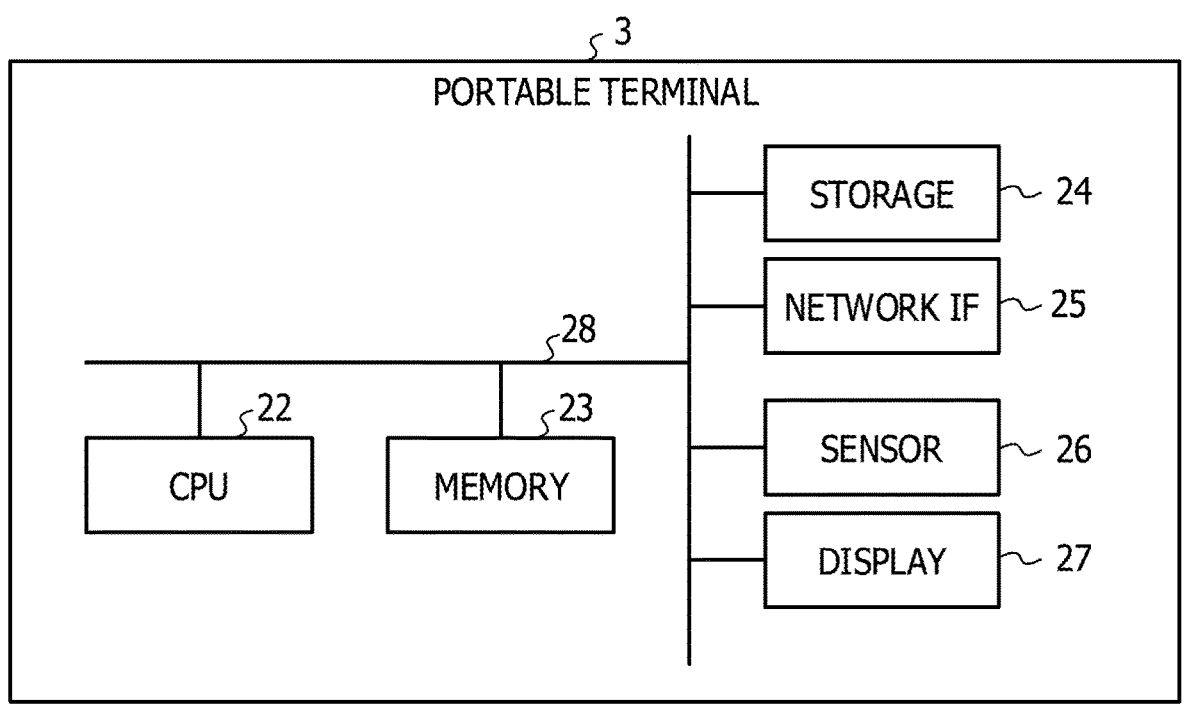
FIG. 2 is a hardware block diagram of a mobile terminal.

FIG. 2 is a hardware block diagram of a mobile terminal. The mobile terminal 3 includes a CPU 22, a memory 23, a storage 24, a network IF 25, a sensor 26, and a display 27. The CPU 22, the memory 23, the storage 24, the network IF 25, the sensor 26, and the display 27 are coupled to one another via a bus 28, and allow data communication therebetween. Each of the memory 23 and the storage 24 is one of the storing units that store therein information.

The CPU 22 reads out a software program stored in the storage 24 or the memory 23, and executes the software program. The memory 23 temporarily stores therein data read out from the storage 24, data received from the outside by the network IF 25, and the like. The storage 24 stores therein the OS, a software program, data that is referred when the program is executed, and the like. The network IF 25 is a communication device that transmits and receives data via the network 5 with another device. Furthermore, the network IF 25 functions as a distribution circuit that distributes localization information, which is described later. The sensor 26 is, for example, an acceleration sensor that detects a motion of the mobile terminal 3 or a global positioning system (GPS) sensor. The display 27 displays signal detection information from the detection object 4, shop coupon information based on the identification information, and the like.

Figure 3:
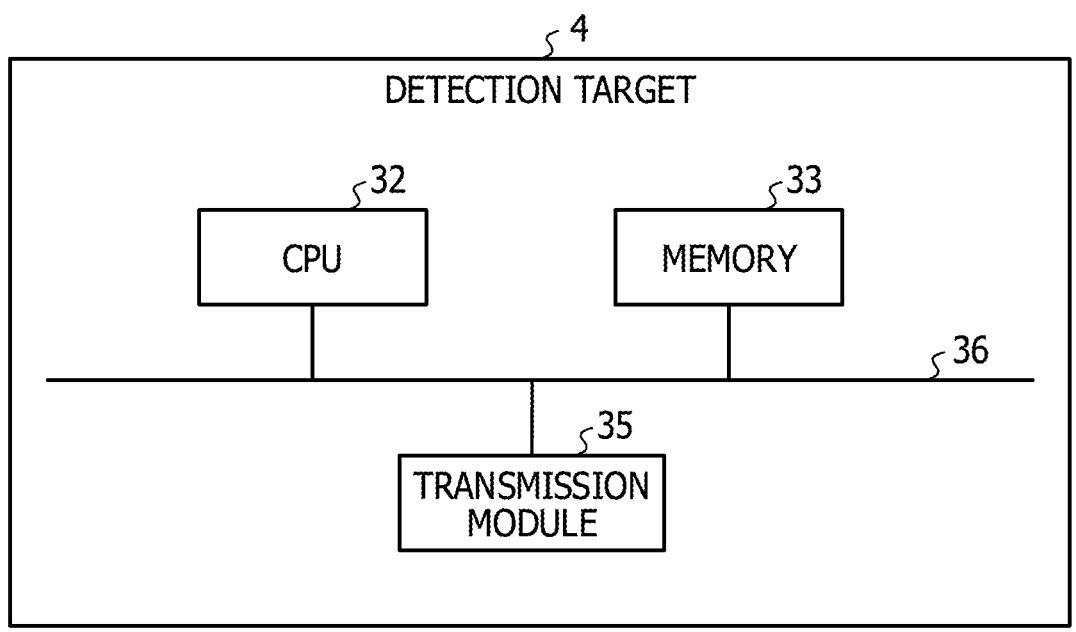
FIG. 3 is a hardware block diagram of a detection object.

FIG. 3 is a hardware block diagram of a detection object. The detection object 4 includes a CPU 32, a memory 33, and a transmission module 35. The CPU 32, the memory 33, and the transmission module 35 are coupled to one another via a bus 36, and allow data communication therebetween. The memory 33 is one of the storing units that store therein information.

The CPU 32 reads out a software program stored in the memory 33, and executes the software program. The memory 33 stores therein unique identification information or placement position information on the detection object 4, a software program, and the like. The transmission module 35 wirelessly transmits information recorded in the memory 33 to the outside.

Figure 4:
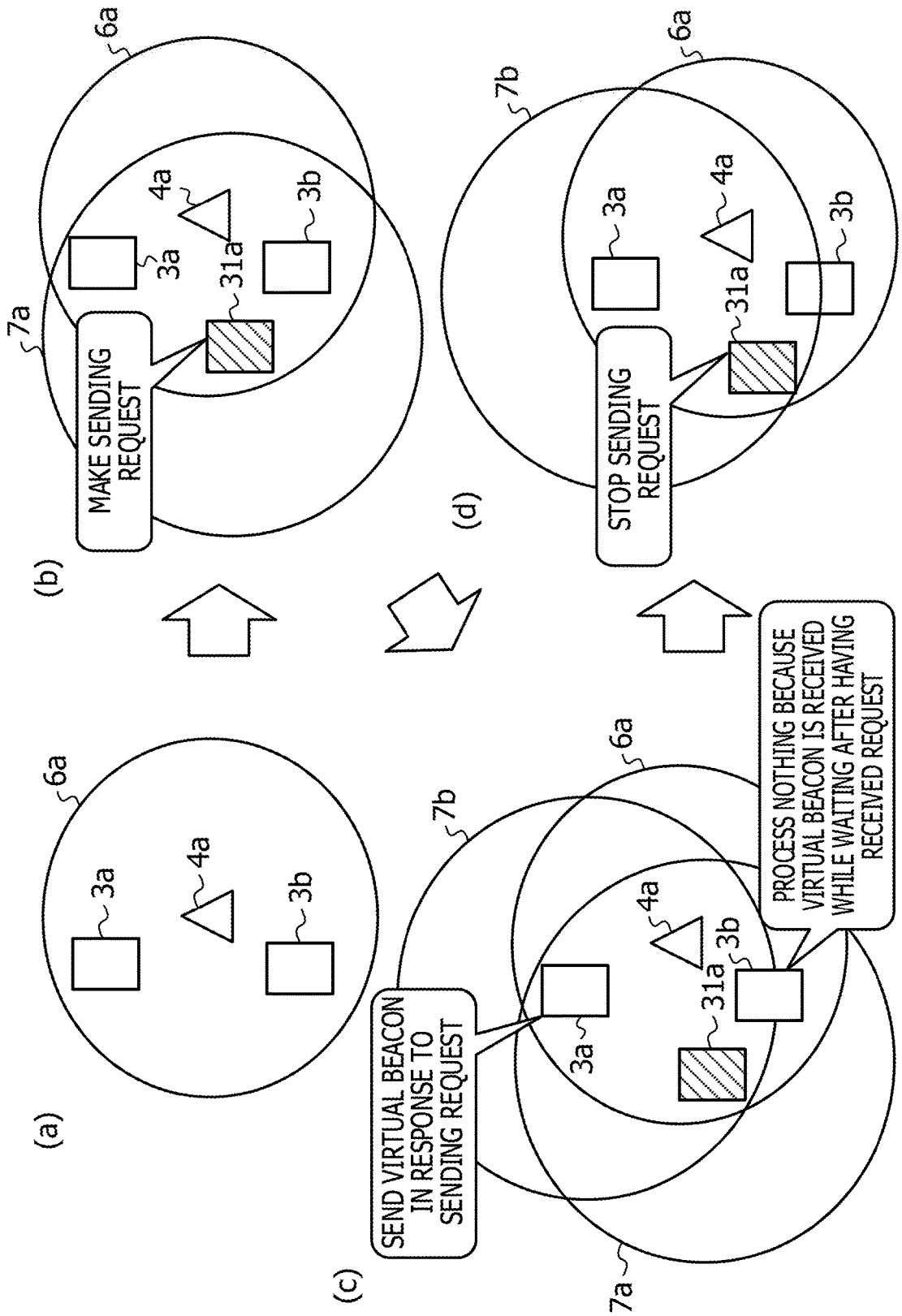
FIG. 4 is conceptual diagram illustrating a state where a mobile terminal is caused to send a virtual beacon signal corresponding to a detection object.

FIG. 4 is conceptual diagram illustrating a state where a mobile terminal is caused to send a virtual beacon signal corresponding to a detection object. In (a) of FIG. 4 illustrates a state where the mobile terminals 3a and 3b are present in the area 6a in which a beacon signal from the detection object 4a is capable of being received. In (b) of FIG. 4 illustrates a state where the mobile terminals 3a and 3b are present in an area 7a in which a sending request signal from a mobile terminal 31a that makes a sending request is capable of being received. In (c) of FIG. 4 illustrates a state where the mobile terminal 3a having received a sending request signal from the mobile terminal 31a sends a virtual beacon signal in an area 7b. In (d) of FIG. 4 illustrates a state where the mobile terminal 31a having received the virtual beacon signal sent from the mobile terminal 3a stops the sending request.

In (a) of FIG. 4, the mobile terminals 3a and 3b that enter into the area 6a do not autonomously send virtual beacon signals in this example. The mobile terminal 31a is a terminal that makes a sending request of a virtual beacon signal with respect to another mobile terminal. As is in (b) of FIG. 4, it is assumed the mobile terminal 31a that makes a sending request enters into the area 6a, and accordingly the mobile terminals 3a and 3b enter into the area 7a in which the sending request signal from the mobile terminal 31a is capable of being received. Another mobile terminal having received a sending request signal in a state of a beacon signal being received sends a virtual beacon signal in accordance with the condition.

In (c) of FIG. 4, the mobile terminal 3a having received a sending request signal sends a virtual beacon signal earlier than the mobile terminal 3b. The mobile terminal 3b having received a sending request signal from the mobile terminal 31a similar to the mobile terminal 3a ends the virtual beacon signal sending process without processing anything because the mobile terminal 3b receives the virtual beacon signal after having received a sending request signal.

In (d) of FIG. 4, the mobile terminal 31a having received the virtual beacon signal from the mobile terminal 3a stops the sending request signal.

As in the foregoing, the mobile terminal sends a virtual beacon signal only when the specific condition is satisfied in response to a sending request from another mobile terminal, so that it is possible to reduce a large number of mobile terminals needlessly and respectively sending virtual beacon signals.

Figure 5:
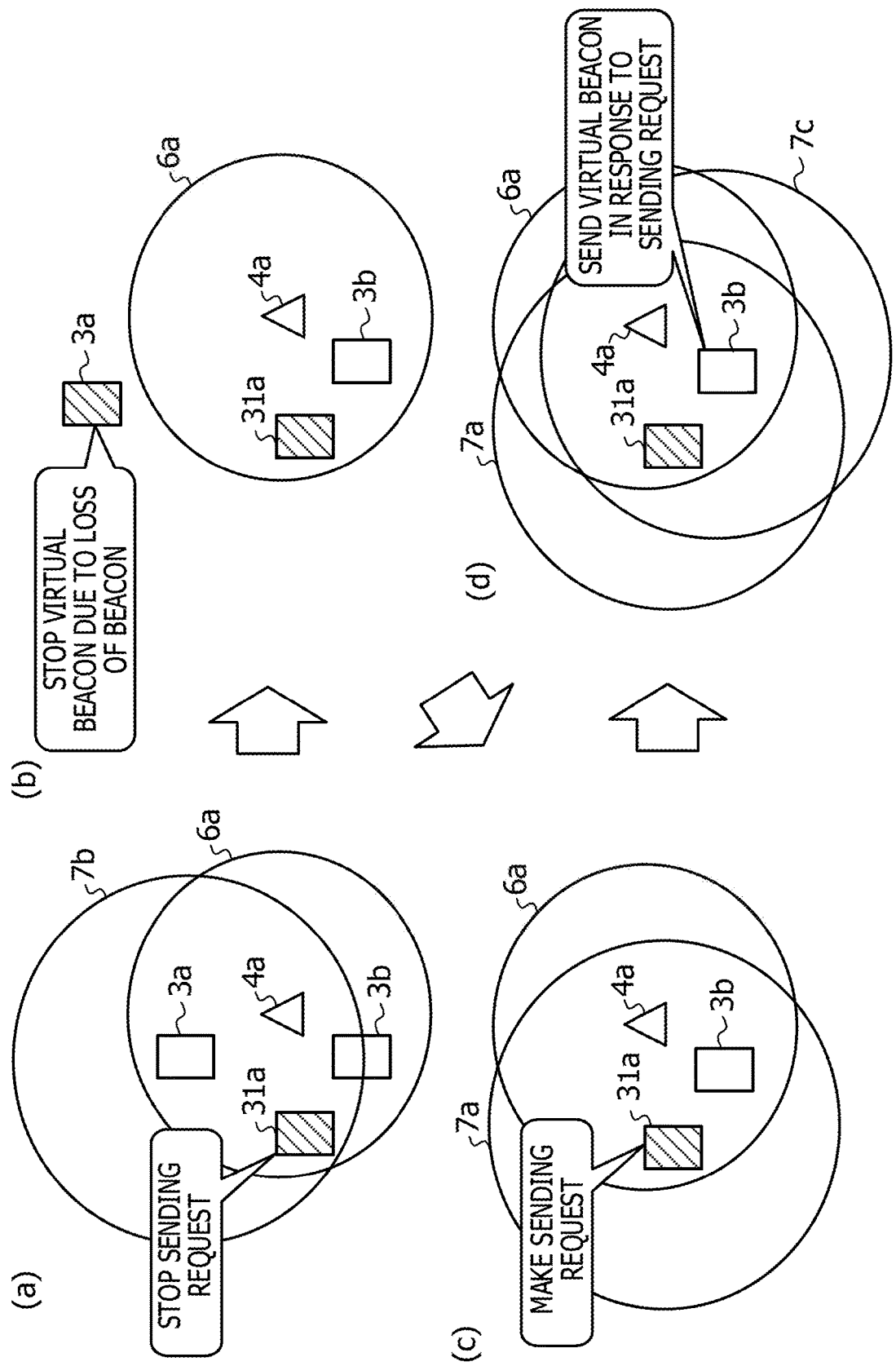
FIG. 5 is conceptual diagram illustrating a process in which the mobile terminal that sends a virtual beacon signal moves to the outside of the area of a detection object.

FIG. 5 is conceptual diagram illustrating a process in which the mobile terminal that sends a virtual beacon signal moves to the outside of the area of a detection object. In (a) FIG. 5 illustrates a state where the mobile terminal 3a sends a virtual beacon signal from the detection object 4a in the area 7b. in (b) of FIG. 5 illustrates a state where the mobile terminal 3a moves to the outside of the area 6a of the detection object 4a, and stops sending a virtual beacon signal. In (c) of FIG. 5 illustrates a state where the mobile terminal 31a again makes a sending request of a virtual beacon signal. In (d) of FIG. 5 illustrates a state where the mobile terminal 3b having received a sending request signal starts sending a virtual beacon signal.

In (a) of FIG. 5, when the mobile terminal 31a receives the virtual beacon signal sent from the mobile terminal 3a, the mobile terminal 31a stops sending a sending request signal. In (b) FIG. 5, the mobile terminal 3a moves to the outside of the area 6a of the beacon signal sent from the detection object 4a, the mobile terminal 3a stops sending a virtual beacon signal. In (c) FIG. 5, when the mobile terminal 31a becomes unable to receive the virtual beacon signal, the mobile terminal 31a restarts sending a sending request signal. In (d) FIG. 5, the mobile terminal 3b inside the area 6a of the detection object 4a receives the sending request signal from the mobile terminal 31a, and executes sending a virtual beacon signal.

As in the foregoing, the information processing system is capable of switching a sending operation of a virtual beacon signal with respect to another mobile terminal that receives a beacon signal, even when a mobile terminal that sends a virtual beacon signal moves out of the area in which the beacon signal is capable of being received.

Figure 6:
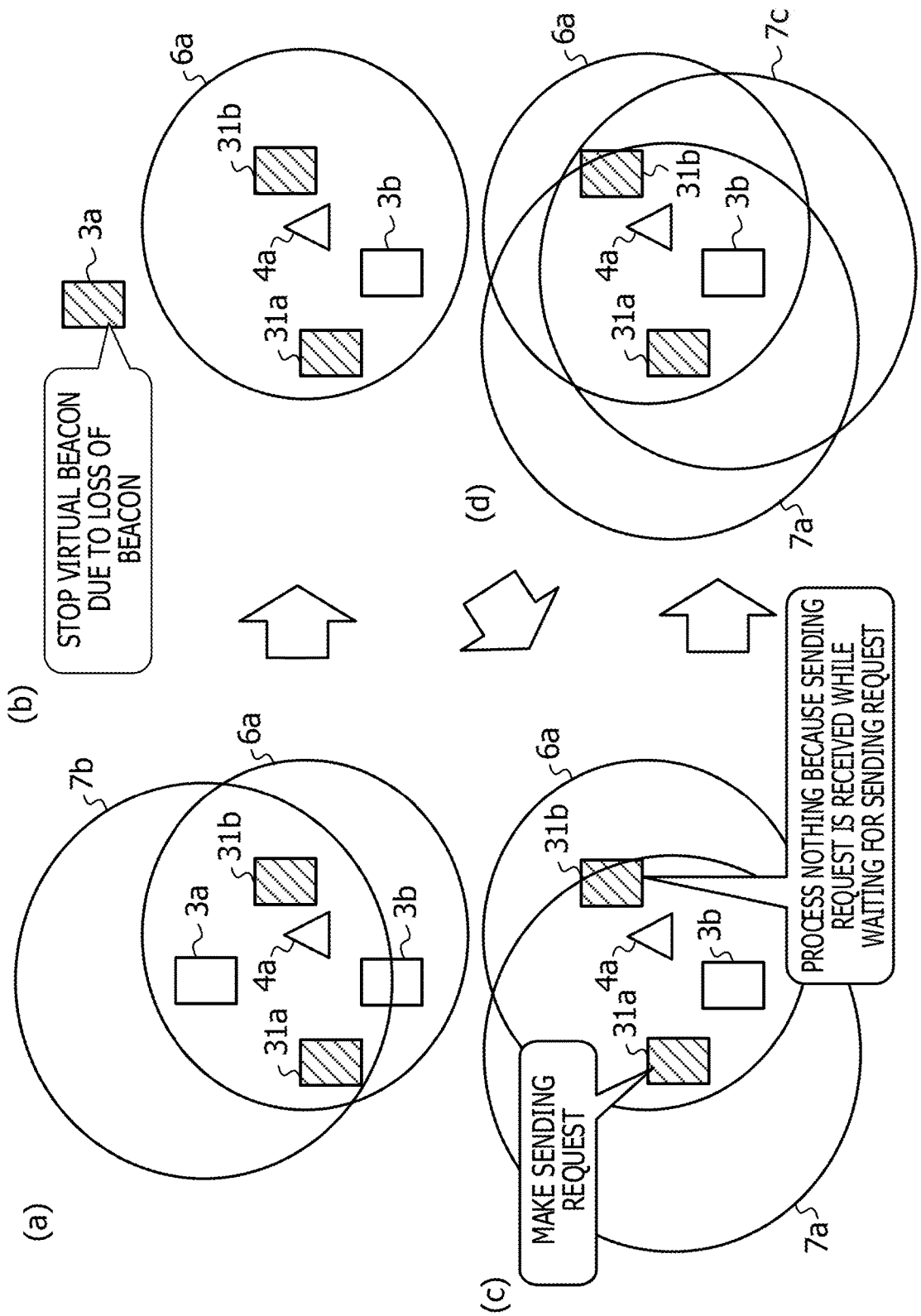
FIG. 6 is conceptual diagram illustrating an operation of the mobile terminal having received a sending request from another mobile terminal.

FIG. 6 is conceptual diagram illustrating an operation of a mobile terminal having received a sending request from another mobile terminal. In (a) of FIG. 6 illustrates a state where the mobile terminals 31a and 31b that each make a sending request are present inside the area 7b of the virtual beacon signal sent from the mobile terminal 3a. In (b) of FIG. 6 illustrates a state where the mobile terminal 3a that sends a virtual beacon signal moves to the outside of the area 6a of the beacon signal from the detection object 4a, and sending of the virtual beacon signal is stopped. In (c) of FIG. 6 illustrates a state where the mobile terminal 31a makes a sending request of a virtual beacon signal, and the mobile terminal 31b receives a sending request signal from the mobile terminal 31a and does not send a sending request signal. In (d) of FIG. 6 illustrates a state where the mobile terminal 3b having received a sending request signal transmitted from the mobile terminal 31a sends a virtual beacon signal.

As in the foregoing, even when a plurality of mobile terminals that each make a sending request is present in an area in which one beacon signal is capable of being received, the information processing system is capable of specifying the sending request operation to one mobile terminal.

Figure 7:
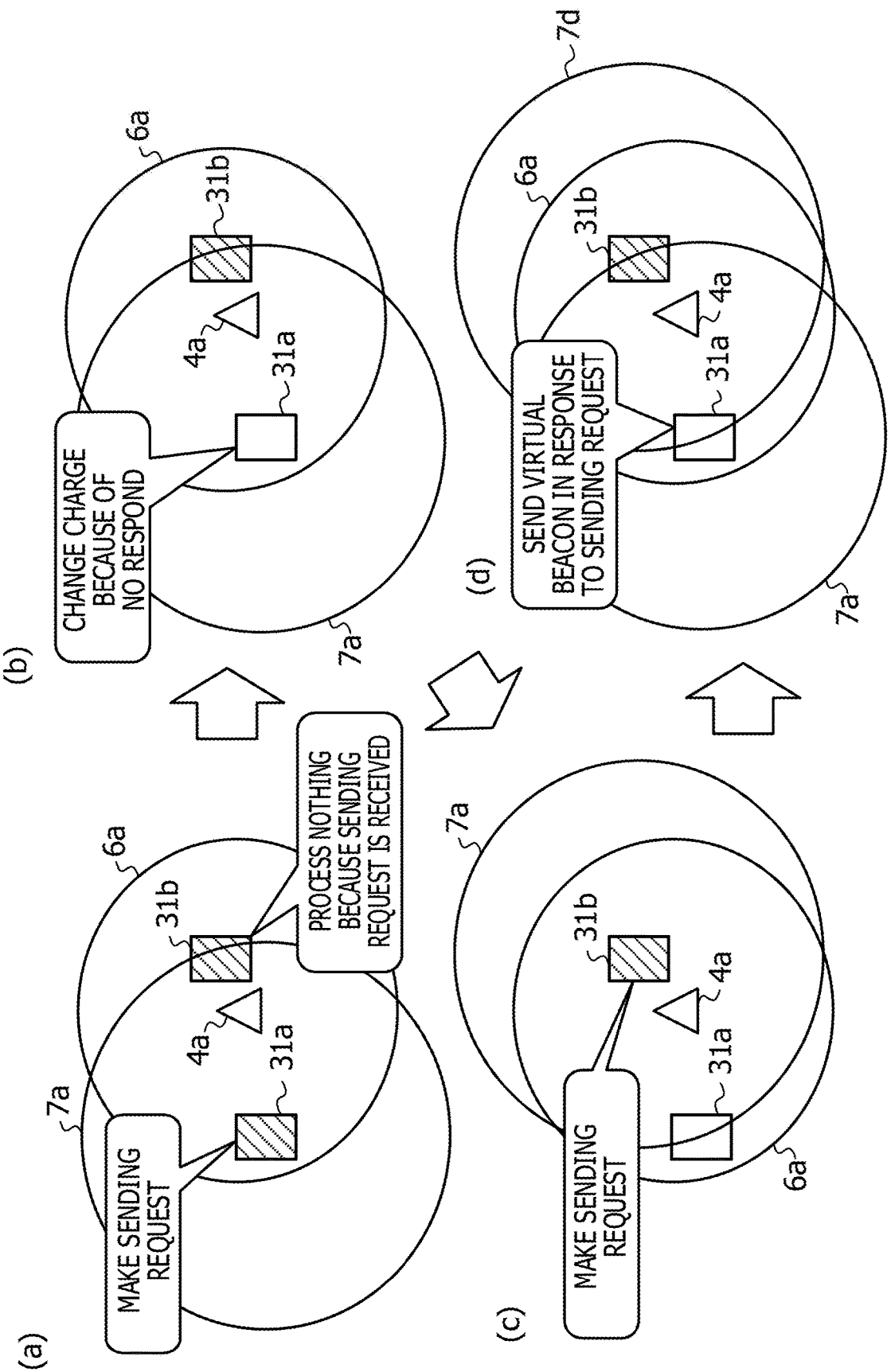
FIG. 7 is conceptual diagram illustrating a state where a mobile terminal that makes a sending request changes an operation in charge.

FIG. 7 is conceptual diagram illustrating a state where a mobile terminal that makes a sending request changes an operation in charge. In (a) of FIG. 7 illustrates a state where only the mobile terminals 31a and 31b that each make a sending request are present in the area 6a in which a beacon signal from the detection object 4a is capable of being received. In (b) of FIG. 7 illustrates a state where after the mobile terminal 31a that makes a sending request makes a sending request, the mobile terminal 31a changes the self charge from the sending request to the transmission of a virtual beacon signal because no virtual beacon signal is received. In (c) of FIG. 7 illustrates a state where the mobile terminal 31b makes a sending request of a virtual beacon signal. In (d) of FIG. 7 illustrates a state where the mobile terminal 31a sends a virtual beacon signal in response to the sending request signal sent from the mobile terminal 31b. The charge herein indicates a plurality of operation modes previously set to the mobile terminal.

As illustrated in (a) of FIG. 7, when no mobile terminal that is capable of transmitting a virtual beacon signal is present in the area in which a beacon signal from the detection object 4a is capable of being received, the sending requests by the mobile terminals 31a and 31b become useless. Therefore, when no mobile terminal that transmits a virtual beacon signal appears after the mobile terminals 31a and 31b each make a sending request, as illustrated in (b) of FIG. 7, the mobile terminal 31a that makes a sending request changes the charge thereof to be a mobile terminal that sends a virtual beacon signal. This allows the mobile terminal 31a to respond to the mobile terminal 31b as another mobile terminal that makes a sending request, as illustrated in (c) of FIG. 7. As a result, as illustrated in (d) of FIG. 7, the mobile terminal 31a is capable of sending a virtual beacon signal in response to the sending request.

Figure 8:
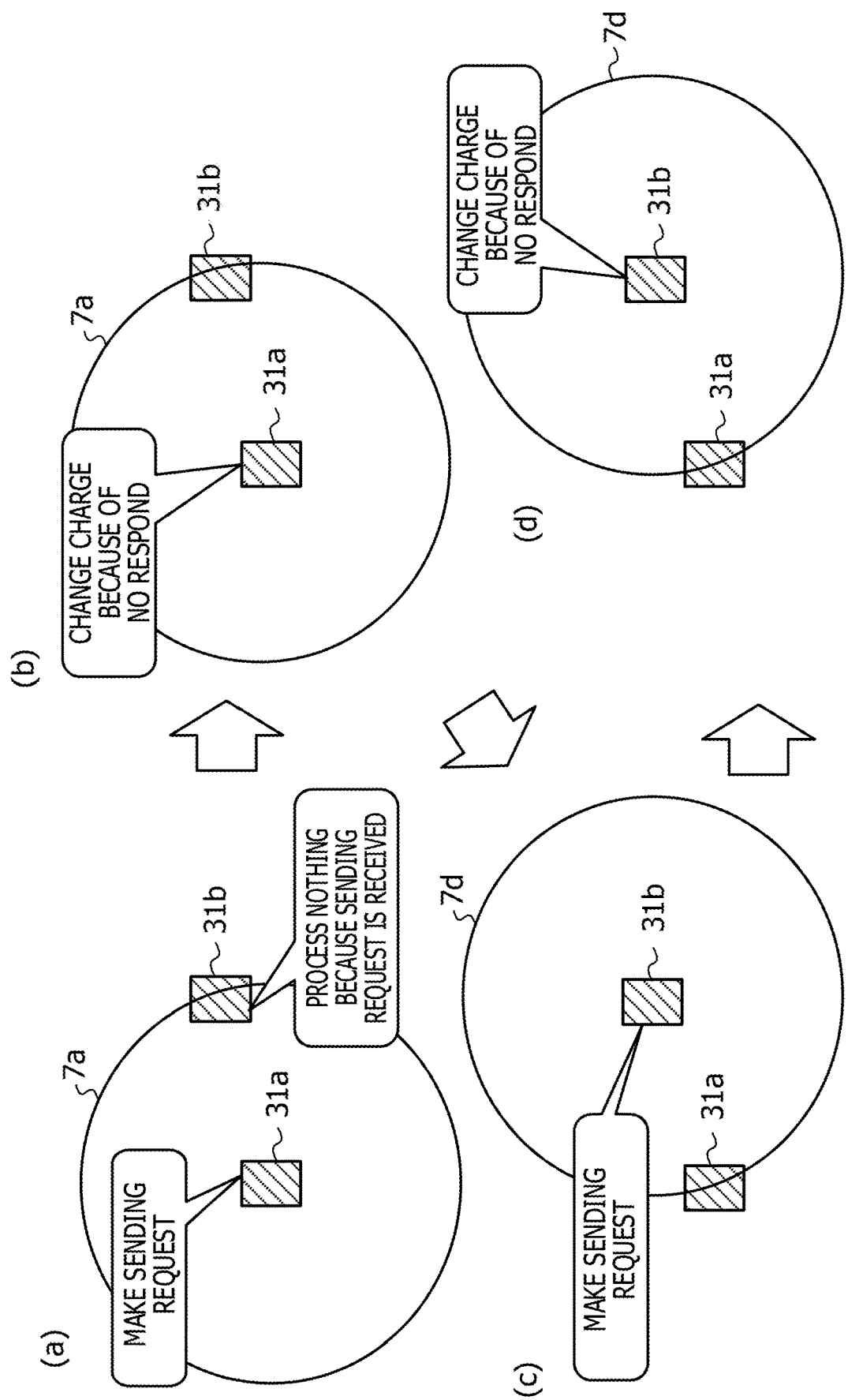
FIG. 8 is conceptual diagram illustrating a state where a mobile terminal that makes a sending request is changed.

FIG. 8 is conceptual diagram illustrating a state where a mobile terminal that makes a sending request is changed. In (a) of FIG. 8 illustrates a state where the mobile terminal 31a makes a sending request, and the mobile terminal 31b having received a sending request signal executes no process. In b) of FIG. 8 illustrates a state where the mobile terminal 31a changes the charge of the sending request because no virtual beacon signal is received with respect to the transmission of the sending request signal. In (c) of FIG. 8 illustrates a state where after the charge of the sending request is changed, the mobile terminal 31b makes a sending request. In (d) of FIG. 8 illustrates a state where the mobile terminal 31b changes the charge of the sending request because no virtual beacon signal is received with respect to the transmission of the sending request signal.

As in the foregoing, the mobile terminal that makes a sending request periodically makes a sending request while changing the charge so as to send a virtual beacon signal. The charge change of the mobile terminal that makes a sending request allows the area in which a sending request signal is sent to be distributed.

Figure 9:
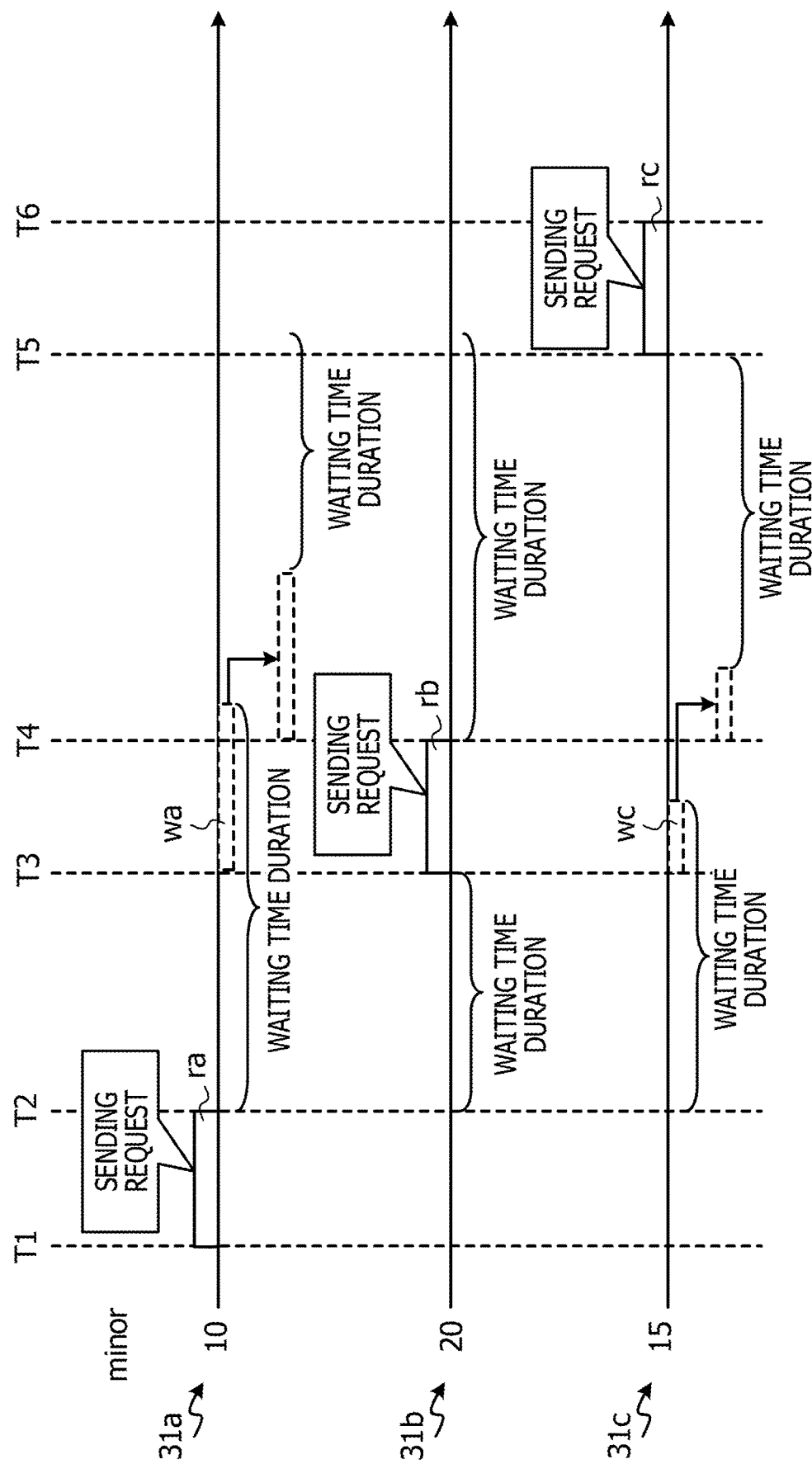
FIG. 9 illustrates time charts illustrating a state where sending requests from mobile terminals are distributed.

FIG. 9 illustrates time charts illustrating a state where sending requests from mobile terminals are distributed. In FIG. 9, sequentially from the top, the time charts of the mobile terminals 31a, 31b, and 31c are illustrated. In the present embodiment, 10 as a minor value is allocated to the mobile terminal 31a, 20 as a minor value is allocated to the mobile terminal 31b, 15 as a minor value is allocated to the mobile terminal 31c. In the embodiment, a minor value is allocated to each mobile terminal 31 in a random manner.

An initial value for the minor value may be decided as follows. An initial value for the minor value is calculated based on the time when the mobile terminal 3 uses this system, and minor values of terminals that start the use at the close time are set to close values. The close minor values result in the early virtual beacon sending from the sending request, and the long waiting time duration from the virtual beacon sending stop due to the charge beacon loss to the sending request. This exhibits an effect in the same movement. In other words, the mobile terminals 3 with the close start time may be considered to be included in the group, so that setting the close minor values aims the abovementioned effect. Moreover, it is also effective to vary the minor values by the large number of beacons from the detection object. When the number of beacons is small, the charge is not requested to be changed, and the minor values are set without being varied. This results in the early virtual beacon sending from the sending request. When the number of beacons is large, the beacon from the detection object is detected while changing the charge, so that the minor values are caused to vary. This results in the short waiting time duration of the sending request, and the charge when no virtual beacon sending is performed is changed early.

The mobile terminal 31a makes a sending request during a time duration ra from a time T1 to a time T2. The mobile terminal 31a is in a standby state after the sending request is ended, during a waiting time duration that is previously set. Another mobile terminal having received the sending request from the mobile terminal 31a sets a waiting time duration in accordance with a difference between a minor value of the mobile terminal 31a and a self minor value. In the present embodiment, each mobile terminal sets the waiting time duration shorter as the difference in minor value is greater. For example, each mobile terminal may set the waiting time duration based on a reciprocal number of the difference between the minor value included in the sending request signal and the self minor value. In the present embodiment, the minor value of the mobile terminal 31b is 20 and the minor value of the mobile terminal 31a is 10, a difference value therebetween becomes 10. Similarly, a difference value in minor value between the mobile terminal 31a and the mobile terminal 31c becomes 5. The mobile terminal 31b has a greater difference value and thus has a shorter waiting time duration than the mobile terminal 31c. As in the foregoing, the waiting time duration is decided based on the difference value in minor value, so that it is possible to distribute the waiting time durations of the respective mobile terminals.

The mobile terminal 31b makes a sending request during a time duration rb after the waiting time duration corresponding to the abovementioned difference has been elapsed from the time T2. At a time T3 when the mobile terminal 31b starts the sending request, the mobile terminals 31a and 31c remain in the waiting state. Each mobile terminal adds the time duration from the time T3 when the mobile terminal 31b starts the sending request until the waiting time duration of each mobile terminal is ended, to a waiting time duration from a time T4 when the mobile terminal 31b ends the sending request. For example, the mobile terminal 31a becomes in a standby state from the time T4, in a time duration wa from the time T3 until the waiting time duration is ended. Similarly, the mobile terminal 31c becomes in a standby state from the time T4, in a time duration we from the time T3 until the waiting time duration is ended. Moreover, the waiting time duration of mobile terminals other than the mobile terminal 31b that makes a sending request is decided based on, similar to the case where the mobile terminal 31a makes a sending request, the difference values in minor value of the respective mobile terminals that each make a sending request relative to the minor value of the mobile terminal 31b. The mobile terminal 31a has a greater difference value relative to the minor value of the mobile terminal 31b in this example, so that the waiting time duration of the mobile terminal 31a becomes shorter than the waiting time duration of the mobile terminal 31c. Meanwhile, the waiting time duration wa of the mobile terminal 31a from the time T4 is greater than the waiting time duration we of the mobile terminal 31c, so that the waiting time duration from the time T4 of the mobile terminal 31c becomes shorter than that of the mobile terminal 31a. Therefore, the mobile terminal 31c makes a sending request next.

As in the foregoing, the waiting time duration of each mobile terminal is decided based on the difference in minor value, and the waiting time duration that is suspended due to the sending request is added to the next waiting time duration, so that it is possible to distribute mobile terminals that each make a sending request.

Figure 10:
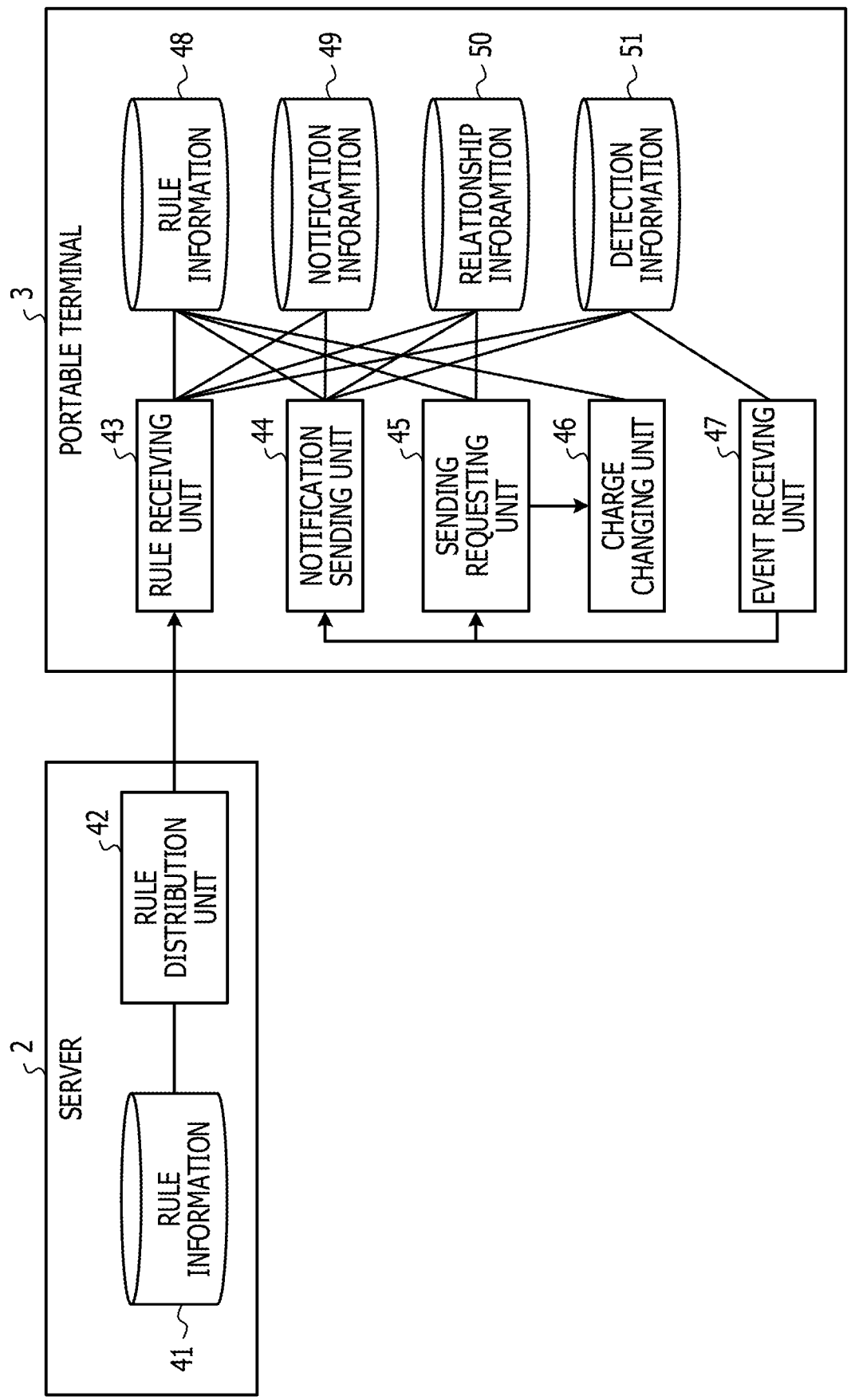
FIG. 10 is a function block diagram of a system in which rule information is distributed from a server to the mobile terminal.

FIG. 10 is a function block diagram of a system in which rule information is distributed from a server to a mobile terminal. The distribution of rule information from a server 2 to the mobile terminal 3 may be implemented, for example, by the execution of an application for accessing the server 2, the application being installed in advance to the mobile terminal 3. Noted that the server 2 in the present embodiment is not the server described above that collectively manages the mobile terminals 3. Moreover, in the present embodiment, the distribution of rule information by the server 2 is not requested.

The server 2 includes rule information 41, and a rule distribution unit 42. The rule information 41 is stored a memory 13 or a storage 14, which is described later, in the server 2. The rule information 41 includes registration rule information, entire rule information, and notification information. The registration rule information includes notification rule information and sending request rule information. The notification rule information is receiving and sending beacon information for notification that is registered in the operating system (OS) of each mobile terminal 3. The notification rule information is configured by only UUID. The sending request rule information is receiving and sending beacon information on a sending request that is registered in the OS. The sending request rule information is configured by UUID and major. The entire rule information is a list of all the detection objects 4. The entire rule information includes UUID, major, and minor of each detection object 4. The notification information is information that is notified when the mobile terminal 3 itself operates as a sending source of the virtual beacon signal. The notification information is a list of the detection objects 4 corresponding to the rule information.

The rule distribution unit 42 is a function block that is implemented in such a manner that a CPU 12, which is described later, in the server 2 executes a program stored in the memory 13 or the storage 14. The rule distribution unit 42 distributes, based on the rule information 41, rule information that each mobile terminal 3 is requested.

The mobile terminal 3 includes a rule receiving unit 43, a notification sending unit 44, a sending requesting unit 45, a charge changing unit 46, an event receiving unit 47, a rule information 48, a notification information 49, a relationship information 50, and a detection information 51. The rule receiving unit 43, the notification sending unit 44, the sending requesting unit 45, the charge changing unit 46, and the event receiving unit 47 are function blocks that are implemented in such a manner that the CPU 22 executes programs stored in the memory 23 or the storage 24.

The rule receiving unit 43 holds, based on rule information distributed from the server 2, the rule information 48 and the notification information 49 on each mobile terminal 3. The details of the process by the rule receiving unit 43 is described later. The event receiving unit 47 determines the type of an event in each mobile terminal 3, and executes a process in accordance with the type of each event. The details of the process by the event receiving unit 47 is described later. The notification sending unit 44 executes a notification sending process based on the type of the event determined by the event receiving unit 47. The details of the process by the notification sending unit 44 is described later. The sending requesting unit 45 requests sending of a virtual beacon signal with respect to another mobile terminal 3. The details of the process by the sending requesting unit 45 is described later. The charge changing unit 46 changes a charge rule allocated to each mobile terminal 3. The details of the process by the charge changing unit 46 is described later.

The rule information 48 includes registration rule information and entire rule information, similar to the rule information 41 described above in the server 2. The notification information 49 is information that is notified when the mobile terminal 3 itself operates as a sending source of a virtual beacon signal, similar to the notification information included in the rule information 41. The relationship information 50 is information as an integer, and for example, a minor value is corresponded in iBeacon. The detection information 51 is information indicating a detection status and a notification status of a charge rule. The detection status indicates detection or non-detection of the detection object 4 that is taken charge by the mobile terminal 3. The notification status indicates a status of during notification, notification waiting, or non-notification of a virtual beacon signal of the detection object 4 that is taken charge by the mobile terminal 3. The detection information 51 may be a detection status with respect to a list of beacon information corresponding to the rule.

As in the foregoing, each mobile terminal 3 is coupled in advance to the server 2, so that each mobile terminal 3 is capable of grasping the registration rule information, the entire rule information, and the notification information.

Figure 11:
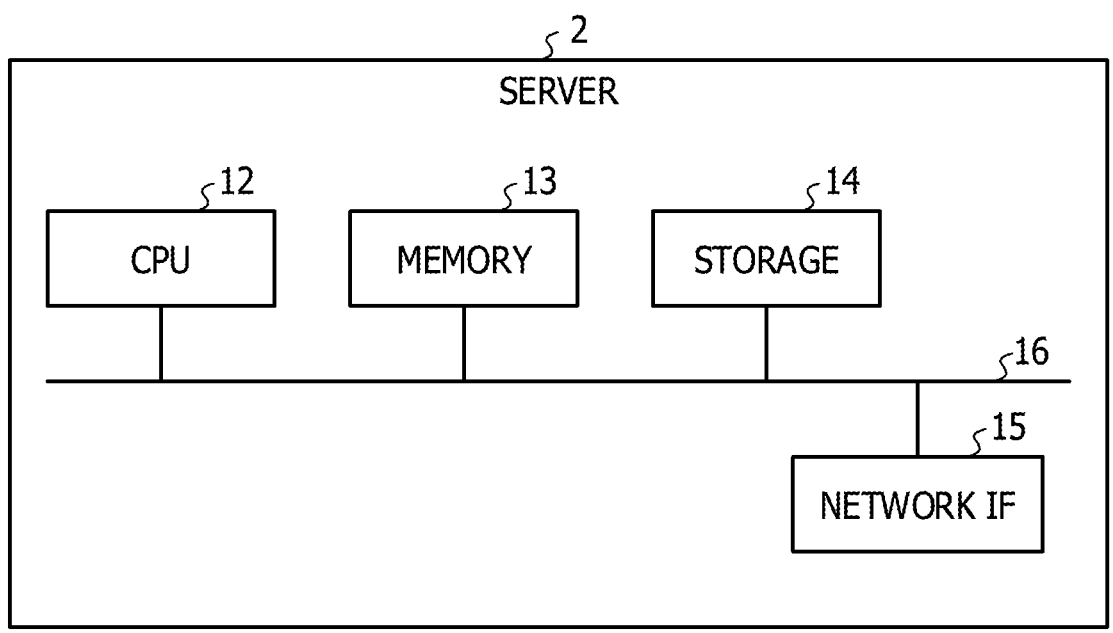
FIG. 11 is a hardware block diagram of the server.

FIG. 11 is a hardware block diagram of a server. The server 2 includes the central processing unit (CPU) 12, the memory 13, the storage 14, and a network interface (IF) 15. The CPU 12, the memory 13, the storage 14, and the network IF 15 are coupled to one another via a bus 16, and are data communicable. Each of the memory 13 and the storage 14 is one of the storing units that store therein information.

The CPU 12 reads out a software program stored in the storage 14 or the memory 13, and executes the software program. The memory 13 temporarily stores therein data read out from the storage 14, data received from the outside by the network IF 15, and the like. The storage 14 stores therein the operating system (OS), a software program, data that is referred when the program is executed, and the like. The network IF 15 transmits and receives data with another device via the network 5.

FIGS. 12A and 12B illustrate concrete examples of rule information. FIG. 12A illustrates a concrete example of registration rule information. FIG. 12B illustrates a concrete example of entire rule information.

In FIG. 12A, a column 61 illustrates notification rule information and sending request rule information that are respective components of the registration rule information. A column 62 illustrates a UUID of each rule information. A column 63 illustrates a major number of each rule information. As illustrated in the column 62 and the column 63, the notification rule information includes only UUID. The sending request rule information includes a UUID having the same value as the UUID of the notification rule information. The value of the UUID of the sending request rule information may be set to the value different from the value of the UUID of the notification rule information.

In FIG. 12B, a column 64 illustrates a detection object. A column 65 illustrates a UUID of each detection object 4. A column 66 illustrates a major number of each detection object 4. A column 67 illustrates a minor number of each detection object 4.

FIGS. 13A and 13B illustrate concrete examples of notification information corresponding to rule information. FIG. 13A illustrates a concrete example of entire rule information. FIG. 13B illustrates notification information. The content of FIG. 13A is the same as the content of FIG. 12B, however, is illustrated again for explanation.

In FIG. 13B, a column 75 illustrates the detection object 4 that is allocated to each mobile terminal 3. A column 76 illustrates a UUID of a beacon signal sent from the mobile terminal 3 when any of the detection objects 4 is allocated. This UUID is the UUID of the notification rule information in FIG. 12A. A column 77 illustrates a major number of a beacon signal sent from the mobile terminal 3 when any of the detection objects 4 is allocated. The notification information illustrated in FIG. 13B is recorded in all the mobile terminals 3. The UUID that is capable of being registered in the mobile terminal 3 may have the constraint on the OS in some cases. The UUIDs of beacon signals sent from the respective mobile terminal corresponded to the detection objects 4 are caused to the same as illustrated in the column 76 of FIG. 13B, and the major values thereof are caused to be different as illustrated in the column 77, so that it is possible to distinguish beacon signals sent from the respective mobile terminals 3 while resolving the constraint on the OS.

Figure 14:
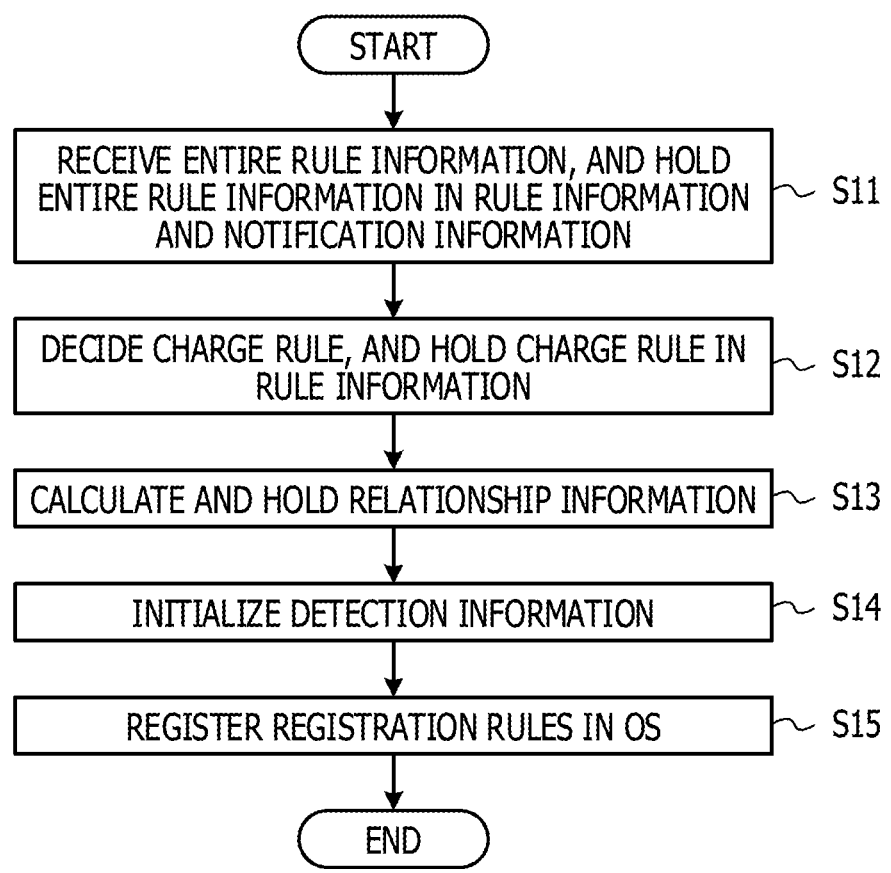
FIG. 14 is a process flow when rule information is distributed from the server to each mobile terminal.

FIG. 14 is a process flow when rule information is distributed from the server to each mobile terminal. The mobile terminal 3 receives entire rule information from the server 2, and holds the entire rule information in rule information and notification information (step S11). The mobile terminal 3 decides, based on the received entire rule information, a charge rule, and holds the charge rule as a charge rule of the rule information (step S12). The mobile terminal 3 calculates an initial value of relationship information, and holds as the relationship information (step S13). The calculation of an initial value is executed, for example, by random number calculation. The calculated initial value is held, for example, as a minor number. The mobile terminal 3 initializes all the detection information into non-detection and non-notification (step S14). The mobile terminal 3 registers registration rules (charge rule, notification rule, and sending request rule) of the rule information in the self OS (step S15). When the mobile terminal 3 detects and loses the detection object 4, and detects and loses the virtual beacon, and detects and loses the sending request beacon, the mobile terminal 3 executes an event of the OS, and performs a process of event reception.

As in the foregoing, the mobile terminal 3 is capable of setting various kinds of information based on the entire rule information that is received in advance from the server 2.

Figure 15A:
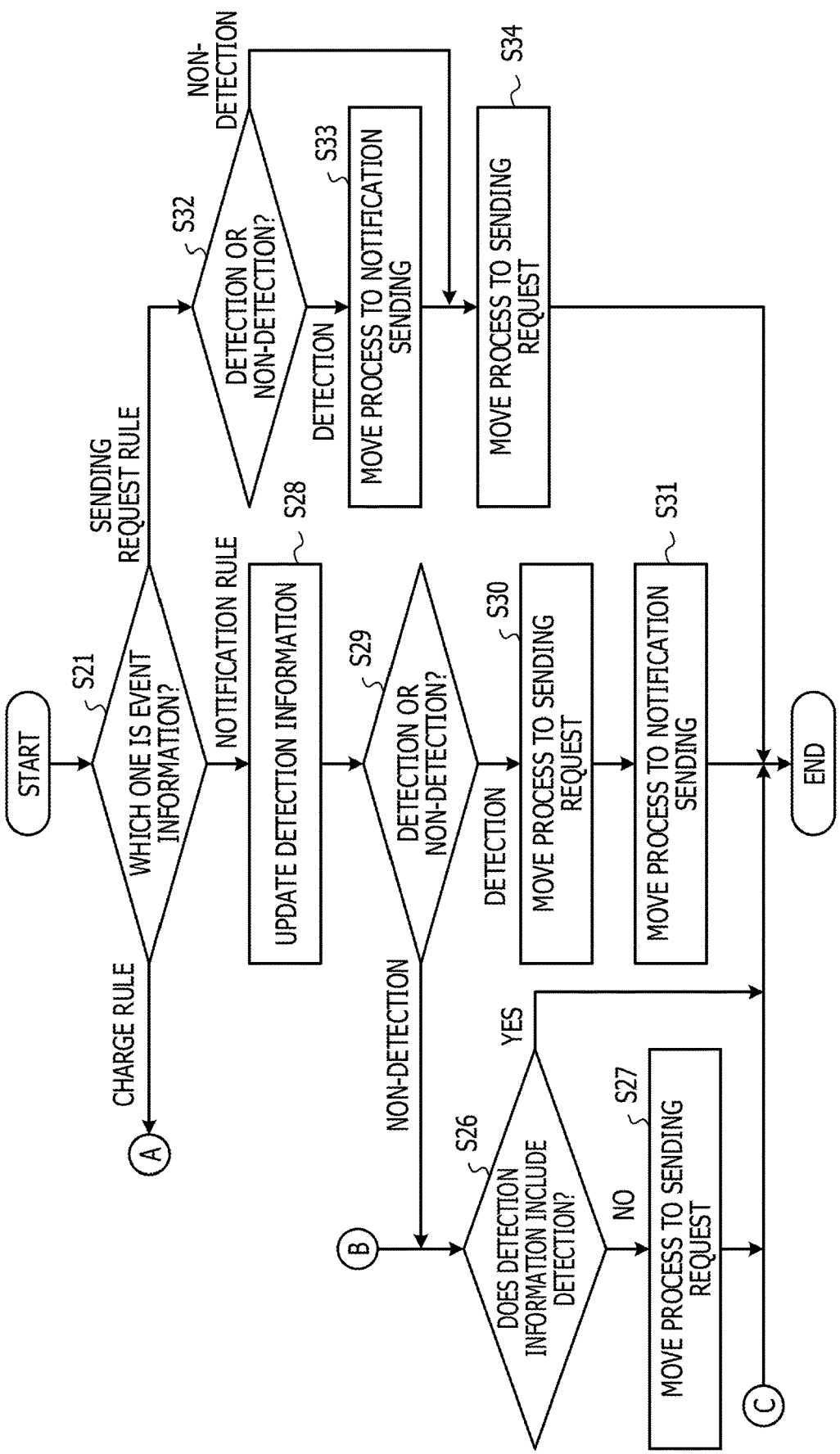
FIG. 15A illustrates a part of a process flow in event reception in the mobile terminal.
Figure 15B:
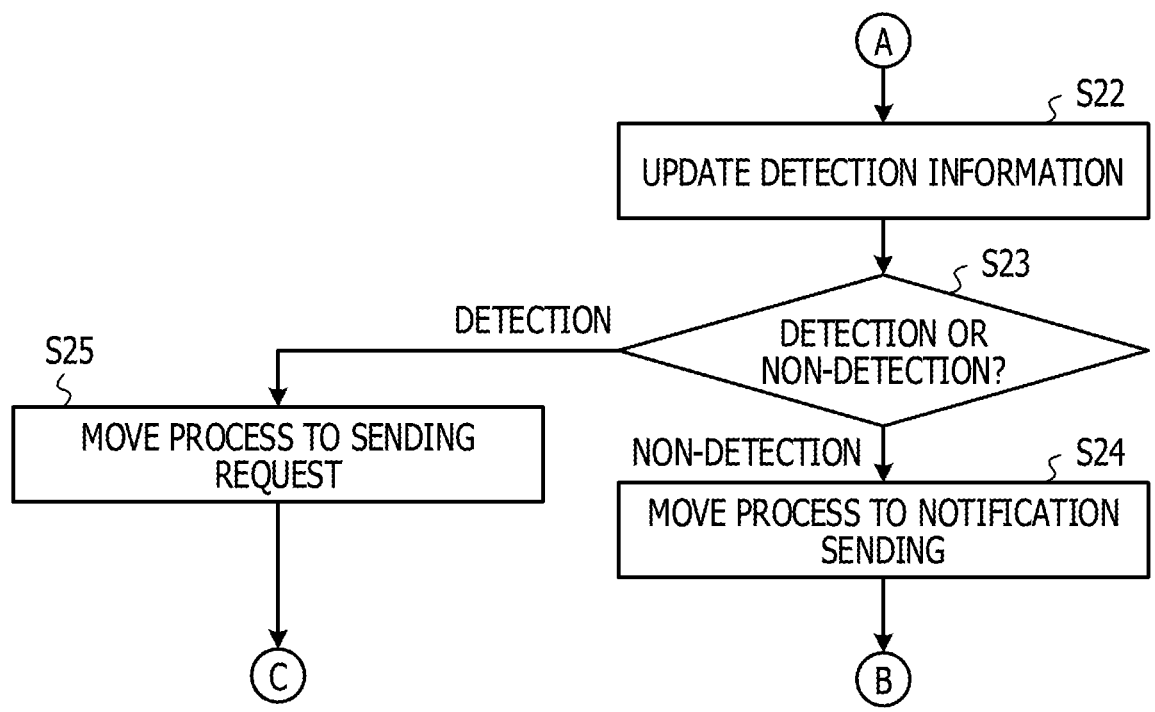
FIG. 15B illustrates a part of the process flow in event reception in the mobile terminal.

FIGS. 15A and 15B are process flows in event reception in the mobile terminal. The processes of FIGS. 15A and 15B are coupled through reference numerals A, B, and C that are respectively enclosed in circles.

When the mobile terminal 3 receives event information, the mobile terminal 3 determines which one of a charge rule, a notification rule, and a sending request rule the received event information is (step S21).

If the event information is a charge rule (step S21: charge rule), the mobile terminal 3 updates detection information (step S22). The mobile terminal 3 determines whether the charge rule is detection or non-detection (step S23). If the charge rule is non-detection (step S23: non-detection), the mobile terminal 3 moves the process to the notification sending (step S24). The mobile terminal 3 determines whether the detection information includes detection (step S26). If the detection information includes no detection (step S26: NO), the mobile terminal 3 moves the process to the sending request (step S27). The sending request process herein is a process of periodically transmitting a sending request signal to the external mobile terminal. If the detection information includes detection (step S26: YES), the mobile terminal 3 ends the process. If the charge rule is detection (step S23: detection), the mobile terminal 3 moves the process to the sending request (step S25).

If the event information is a notification rule (step S21: notification rule), the mobile terminal 3 updates the detection information (step S28). The mobile terminal 3 determines whether the notification rule is detection or non-detection (step S29). If the notification rule is non-detection (step S29: non-detection), the mobile terminal 3 proceeds the process to processing at a step S26. If the notification rule is detection (step S29: detection), the mobile terminal 3 moves the process to the sending request (step S30). If the mobile terminal 3 is in a mode that the sending request is periodically made, the mobile terminal 3 cancels the sending request. If the mobile terminal 3 is during the sending request, the mobile terminal 3 corrects relationship information. The mobile terminal 3 moves the process to the notification sending (step S31). If the notification corresponds to the charge rule, the mobile terminal 3 cancels the notification waiting.

If the event information is a sending request rule (step S21: sending request rule), the mobile terminal 3 determines whether the sending request rule is detection or non-detection (step S32). If the sending request rule is detection (step S32: detection), the mobile terminal 3 moves the process to the notification sending (step S33), and thereafter moves the process to the sending request (step S34). The mobile terminal 3 becomes the notification waiting if the charge rule is being detected. If the sending request rule is non-detection (step S32: non-detection), the mobile terminal 3 moves the process to the sending request (step S34). The mobile terminal 3 during the cycle mode becomes the waiting state if non-detection, and becomes standby if detection.

Figure 16:
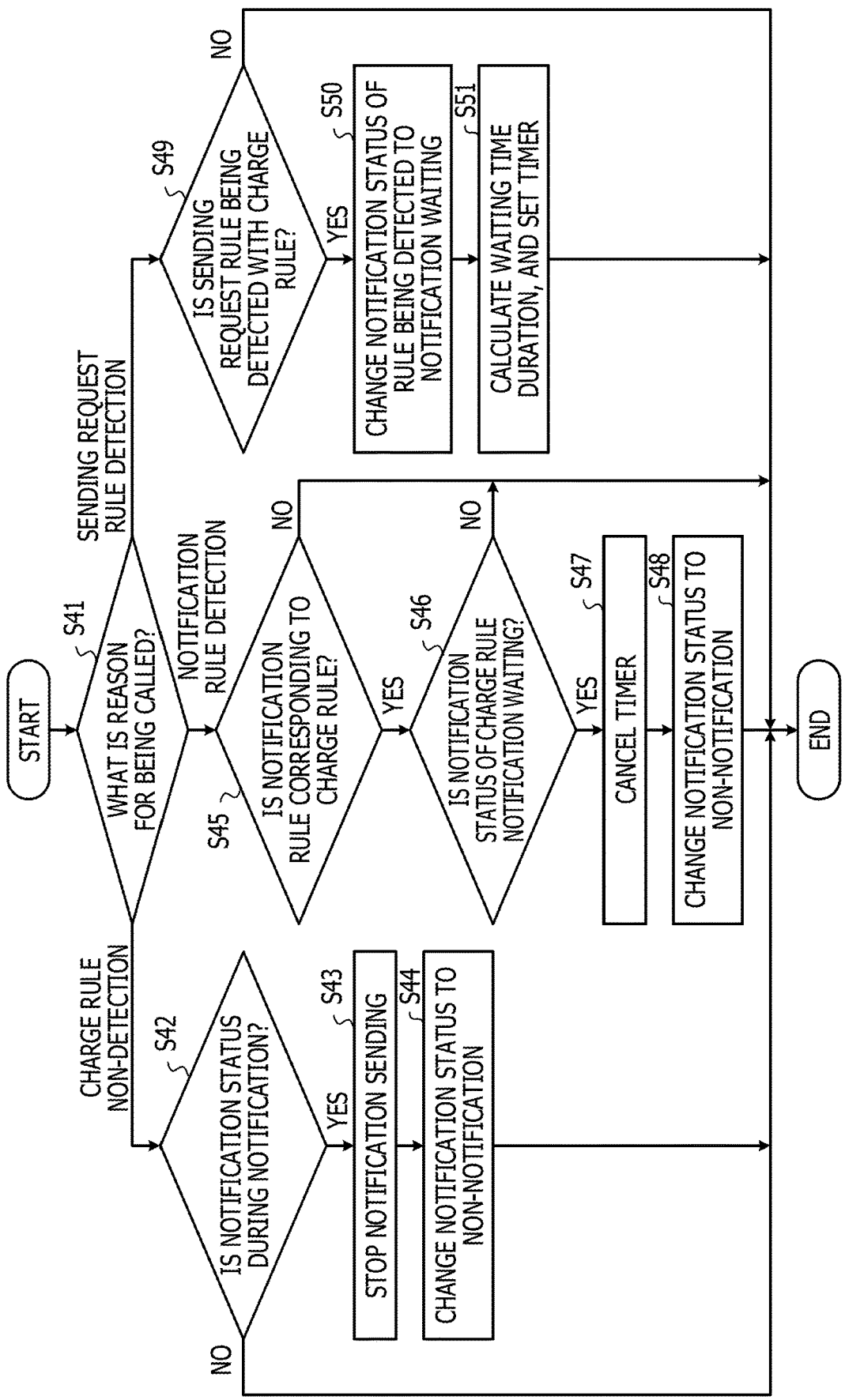
FIG. 16 is a process flow of notification sending in the mobile terminal.

FIG. 16 is a process flow of notification sending in the mobile terminal. The mobile terminal 3 determines a reason for being called by a request signal from the outside (step S41).

If the reason for being called is charge rule non-detection (step S41: charge rule non-detection), the mobile terminal 3 determines whether the notification status is during notification (step S42). If the notification status is during notification (step S42: YES), the mobile terminal 3 stops the notification sending (step S43), and changes the notification status to non-notification (step S44). If the notification status is not during notification (step S42: NO), the mobile terminal 3 ends the notification sending process.

If the reason for being called is notification rule detection (step S41: notification rule detection), the mobile terminal 3 determines whether the detected notification rule is a notification rule corresponding to the charge rule (step S45). If the detected notification rule is a notification rule corresponding to the charge rule (step S45: YES), the mobile terminal 3 determines whether the notification status of the charge rule is notification waiting (step S46). If the notification status of the charge rule is notification waiting (step S46: YES), the mobile terminal 3 cancels the timer (step S47), and changes the notification status to non-notification (step S48). If the detected notification rule does not correspond to the charge rule (step S45: NO), or the notification status of the charge rule is not notification waiting (step S46: NO), the mobile terminal 3 ends the notification sending process.

If the reason for being called is sending request rule detection (step S41: sending request rule detection), the mobile terminal 3 determines whether the sending request rule is being detected with the charge rule (step S49). If the sending request rule is detected with the charge rule (step S49: YES), the mobile terminal 3 changes the notification status of the rule being detected to notification waiting (step S50), calculates a waiting time duration, and sets the timer (step S51). If the sending request rule is not being detected with the charge rule (step S49: NO), the mobile terminal 3 ends the notification sending process.

Figure 17:
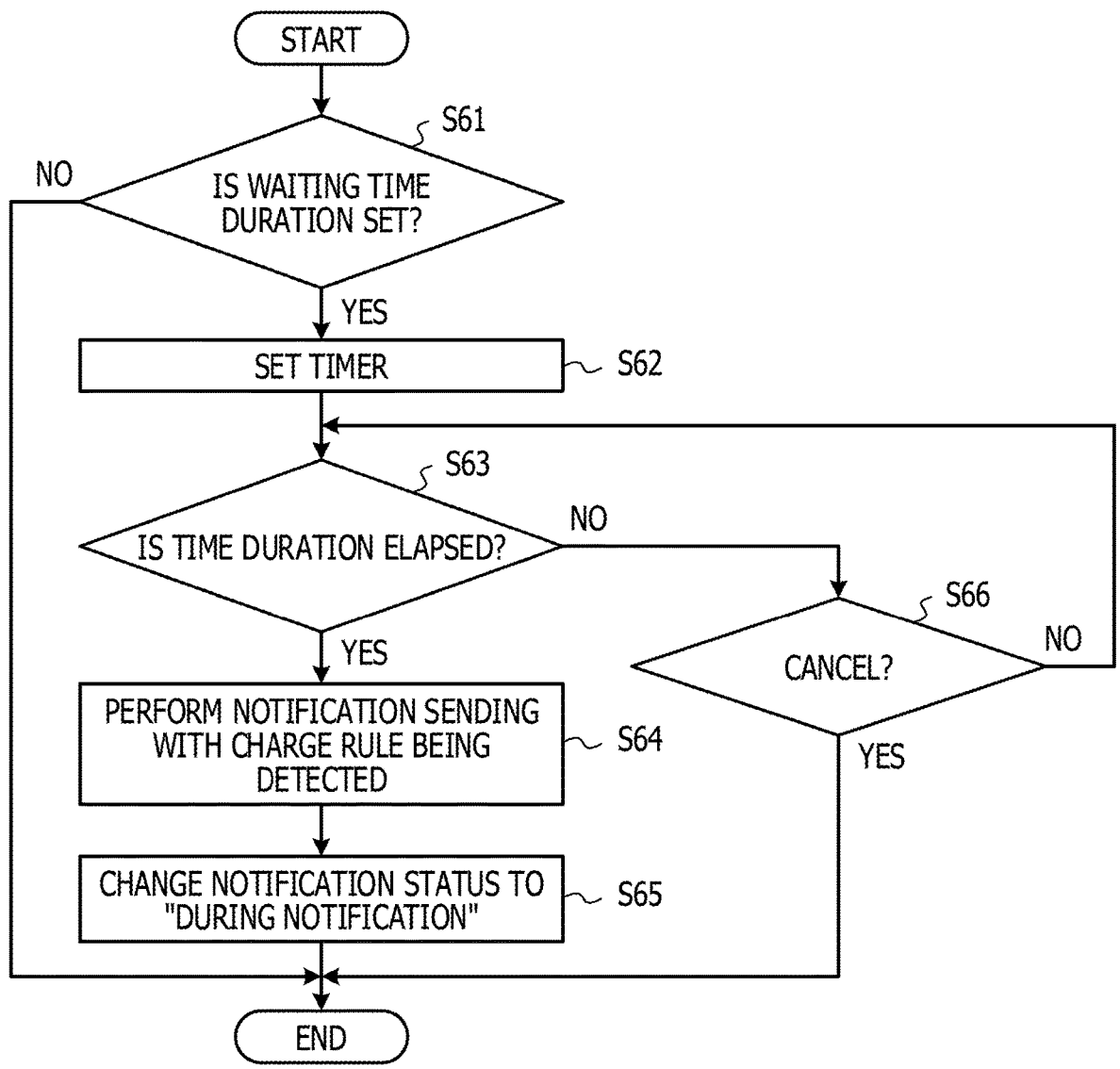
FIG. 17 is a process flow of timer activation in notification sending of the mobile terminal.

FIG. 17 is a process flow of timer activation in notification sending of the mobile terminal. The process flow of FIG. 17 explains the process related to the timer in FIG. 16 in more details. The mobile terminal 3 checks whether a waiting time duration until next notification sending is set (step S61). If the waiting time duration is set (step S61: YES), the mobile terminal 3 sets the timer (step S62). If the waiting time duration is not set (step S61: NO), the mobile terminal 3 ends the process.

The mobile terminal 3 checks whether the set waiting time duration is elapsed (step S63). If the set waiting time duration is elapsed (step S63: YES), the mobile terminal 3 performs notification sending with the charge rule being detected (step S64). The mobile terminal 3 changes the notification status to "during notification" (step S65), and ends the process. If the set waiting time duration is not elapsed (step S63: NO) and cancels the timer due to the notification rule detection from the outside and the like (step S66: YES), the mobile terminal 3 ends the process. If the set waiting time duration is not elapsed (step S63: NO) and the timer is not canceled (step S66: NO), the mobile terminal 3 is again on standby until the waiting time duration is elapsed.

Figure 18A:
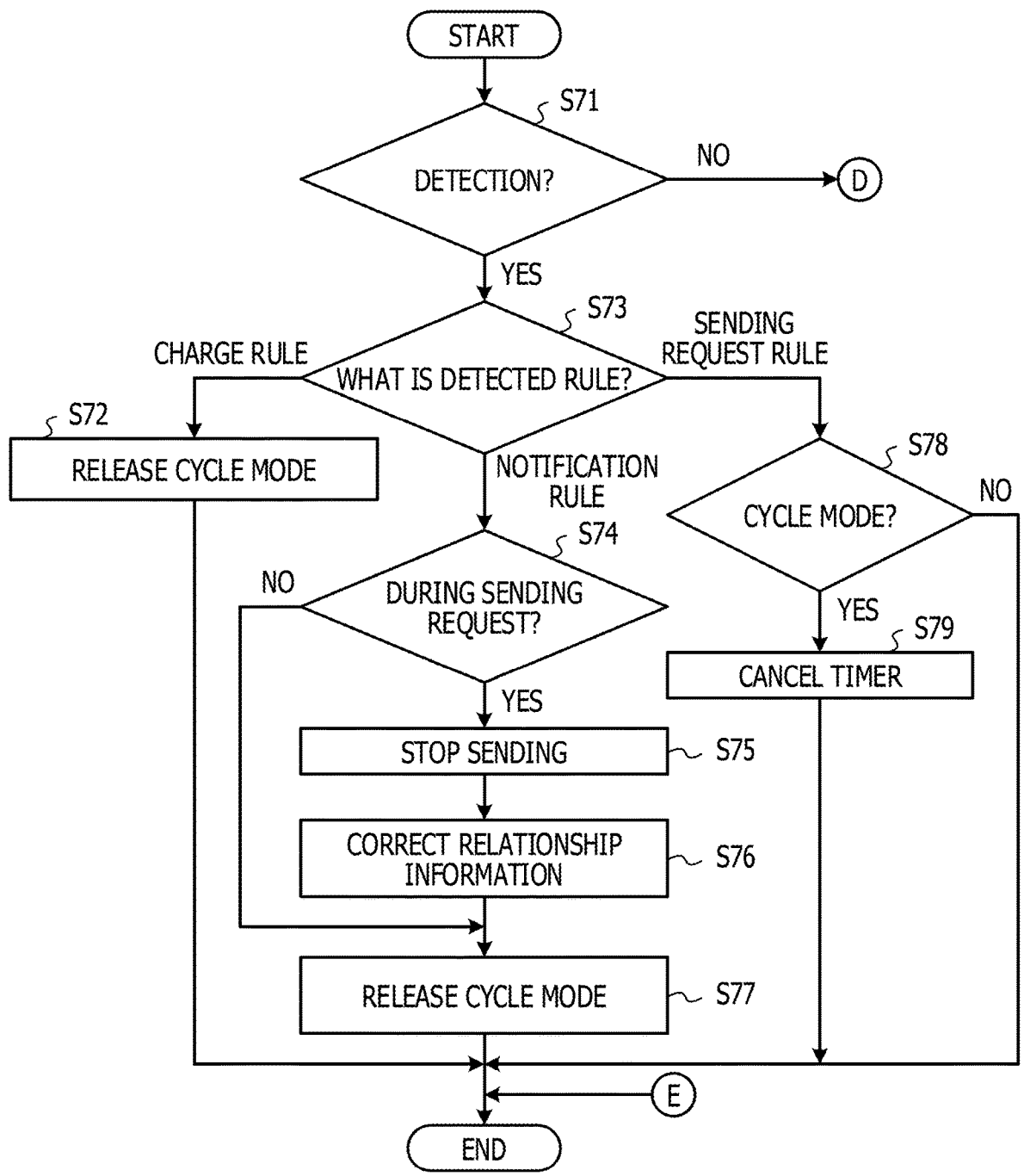
FIG. 18A illustrates a part of a process flow in sending request in the mobile terminal.
Figure 18B:
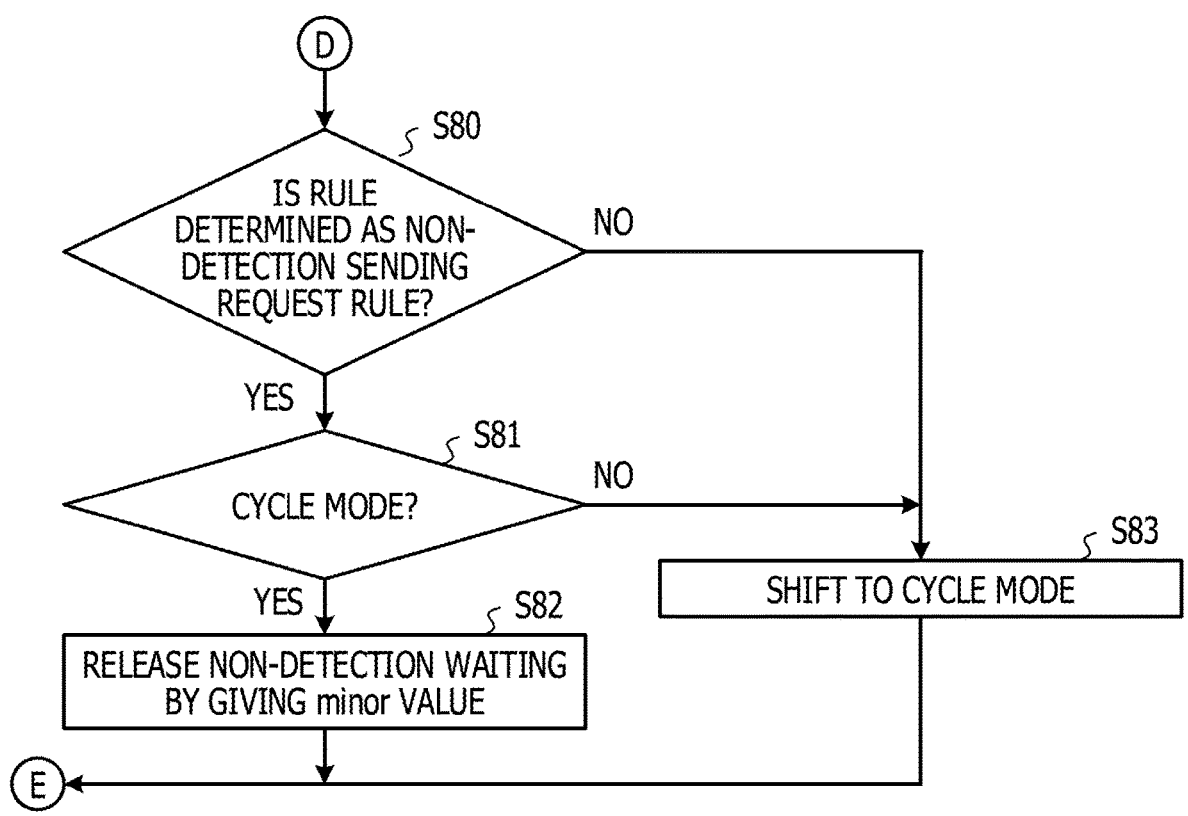
FIG. 18B illustrates a part of the process flow in sending request in the mobile terminal.

FIGS. 18A and 18B are process flows of a sending request in the mobile terminal. The processes of FIGS. 18A and 18B are coupled through reference numerals D and E that are respectively enclosed in circles. The mobile terminal 3 is in a mode in which a sending request is periodically made, as an initial state. In the mode in which a sending request is periodically made, the mobile terminal 3 is in a state where a waiting time duration is decided, and the timer is set.

When the mobile terminal 3 is called from the outside, the mobile terminal 3 determines whether a reason for being called is detection (step S71). If the reason for being called is detection (step S71: YES), the mobile terminal 3 determines the detected rule (step S73). If the detected rule is a charge rule (step S73: charge rule), the mobile terminal 3 releases the cycle mode of the sending request (step S72). In the release of the cycle mode, the mobile terminal 3 stops the sending if the mobile terminal 3 is during the sending request, cancels the timer if the mobile terminal 3 is in a waiting state, and ends the process.

If the detected rule is a notification rule (step S73: notification rule), the mobile terminal 3 determines whether the mobile terminal 3 is during the sending request (step S74). If the mobile terminal 3 is during the sending request (step S74: YES), the mobile terminal 3 stops the sending (step S75), and corrects relationship information based on a minor value of the notification rule (step S76). If the mobile terminal 3 is in a cycle mode, the mobile terminal 3 releases the cycle mode (step S77), and cancels the timer. If the mobile terminal 3 is not during the sending request (step S74: NO), the mobile terminal 3 releases the cycle mode (step S77).

If the detected rule is a sending request rule (step S73: sending request rule) and the mobile terminal 3 is in a cycle mode (step S78: YES), the mobile terminal 3 cancels the timer (step S79). If the detected rule is a sending request rule (step S73: sending request rule) and the mobile terminal 3 is not in a cycle mode (step S78: NO), the mobile terminal 3 ends the process.

If the reason for being called from the outside is non-detection (step S71: NO), the mobile terminal 3 determines whether the rule determined as non-detection is a sending request rule (step S80). If the rule determined as non-detection is a sending request rule (step S80: YES), the mobile terminal 3 determines whether the mobile terminal 3 is a cycle mode (step S81). If the mobile terminal 3 is in a cycle mode (step S81: YES), the mobile terminal 3 releases non-detection waiting of the sending request rule by giving the minor value (step S82), and ends the process.

If the rule determined as non-detection is not a sending request rule (step S80: NO), or the mobile terminal 3 is not in a cycle mode (step S81: NO), the mobile terminal 3 shifts to the cycle mode (step S83), and ends the process.

As in the foregoing, the mobile terminal 3 is capable of performing the sending request process.

Figure 19:
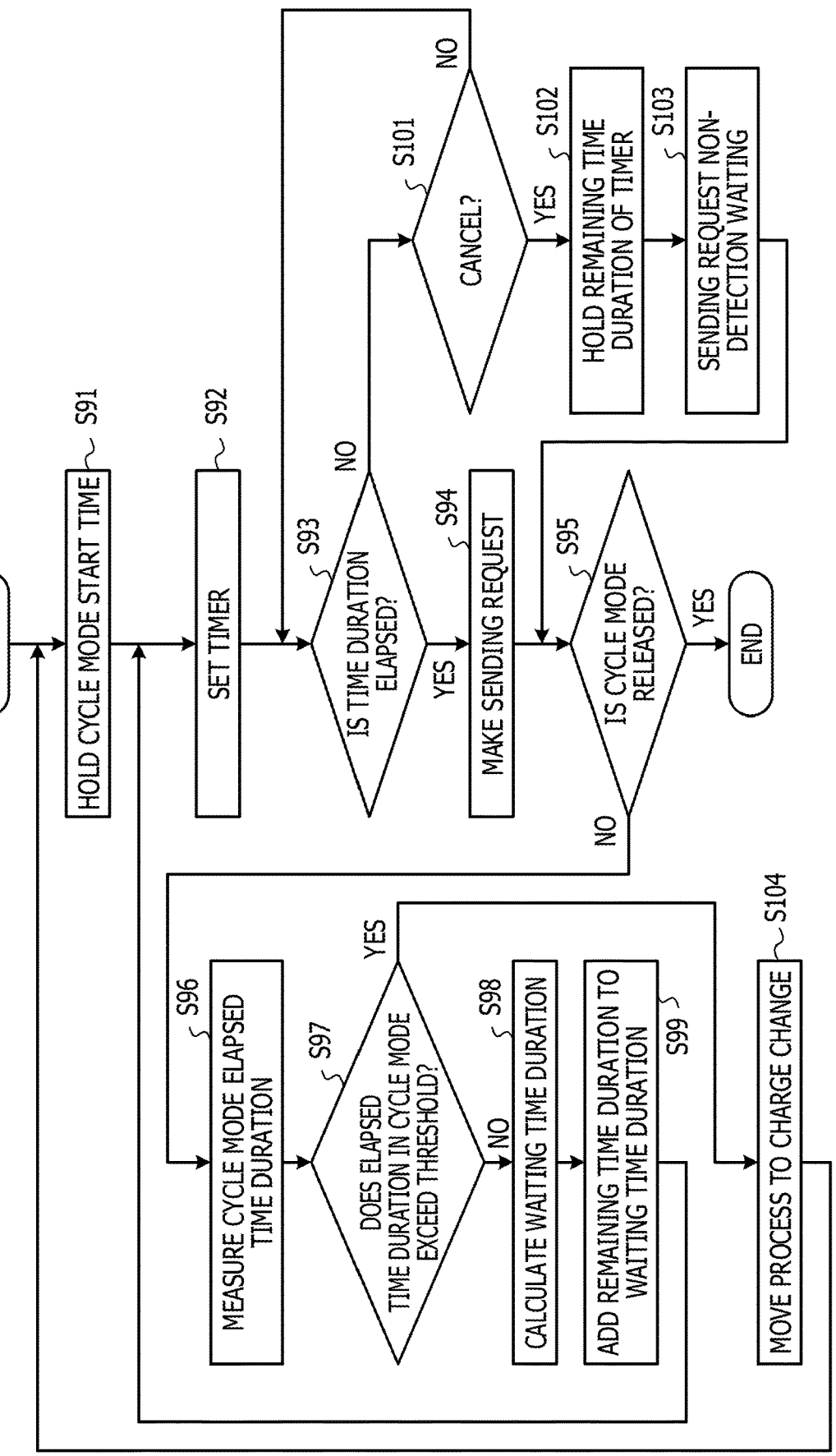
FIG. 19 is a process flow of timer activation in sending request of the mobile terminal.

FIG. 19 is a process flow of timer activation in sending request of the mobile terminal. The mobile terminal 3 makes a sending request of timer activation based on the process flow of FIG. 19. The cycle mode shift instruction at step S83 starts the process of FIG. 19.

The mobile terminal 3 holds a cycle mode start time (step S91), and sets the timer (step S92). The mobile terminal 3 determines whether a timer set time duration is elapsed based on the held cycle mode start time (step S93). If the set time duration is elapsed (step S93: YES), the mobile terminal 3 makes a sending request (step S94). If the set time duration is not elapsed (step S93: NO), the mobile terminal 3 determines whether the timer is canceled at the step S79 (step S101). If the mobile terminal 3 cancels the timer (step S101: YES), the mobile terminal 3 holds a remaining time duration of the timer (step S102), and is in sending request non-detection waiting (step S103). The mobile terminal 3 does not proceed to the next process as long as the non-detection waiting is released at the step S82. If the mobile terminal 3 does not cancel the timer (step S101: NO), the mobile terminal 3 repeats the determination as to whether the setting time duration is elapsed (step S93).

After the mobile terminal 3 executes the sending request (step S94) or the sending request non-detection waiting is released (step S103), the mobile terminal 3 determines whether the mobile terminal 3 releases the cycle mode (step S95). If the mobile terminal 3 releases the cycle mode (step S95: YES), the mobile terminal 3 ends the process of the timer activation in the sending request process. The cycle mode release is instructed at the step S72 and at the step S77. If the mobile terminal 3 does not release the cycle mode (step S95: NO), the mobile terminal 3 measures a cycle mode elapsed time duration (step S96). If the elapsed time duration in the cycle mode exceeds a threshold (step S97: YES), the mobile terminal 3 moves the process to the charge change (step S104), and causes the process to return to the cycle mode start time holding (step S91). If the elapsed time duration in the cycle mode does not exceed a threshold (step S97: NO), the mobile terminal 3 calculates a waiting time duration (step S98), adds the remaining time duration to the waiting time duration (step S99), and causes the process to return to the timer setting process (step S92).

As in the foregoing, the mobile terminal 3 is capable of performing the sending request process to the outside.

Figure 20:
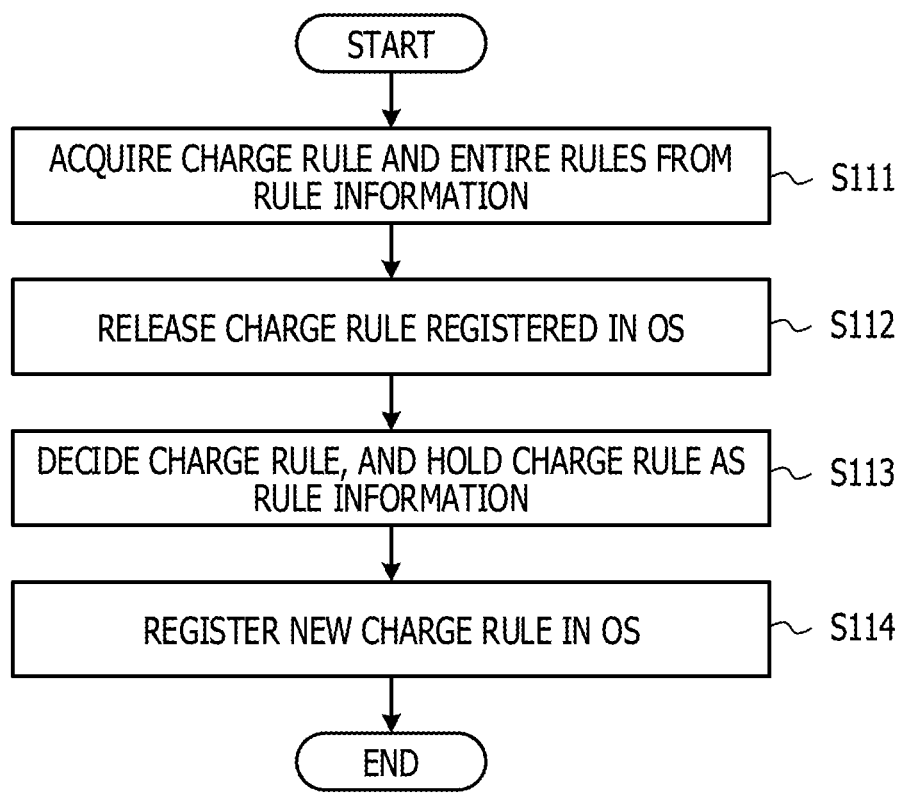
FIG. 20 is a detailed flow of a charge change process in the mobile terminal.

FIG. 20 is a detailed flow of a charge change process in the mobile terminal. FIG. 20 explains the step S104 in FIG. 19 in more details.

In the charge change process, the mobile terminal 3 refers to rule information stored in the memory 23 or the storage 24, and acquires a charge rule and entire rules (step S111). The mobile terminal 3 releases the charge rule registered in the OS (step S112). The mobile terminal 3 decides a new charge rule, and holds the new charge rule as rule information in the memory 23 or the storage 24 (step S113). The mobile terminal 3 registers the new charge rule in the OS (step S114).

As in the foregoing, the mobile terminal 3 is capable of changing the charge rule based on the rule information.

In the waiting time duration control of the timer activation for the sending request and the notification sending, it is possible to add the following elements to the calculation of the waiting time duration. A traveling speed is calculated from an acceleration sensor or the like of the mobile terminal, and the mobile terminal having a fast traveling speed is set to have a long waiting time duration. The mobile terminal having a fast traveling speed is highly probable to be apart from a beacon of a detection object, so that the long waiting time duration makes the mobile terminal difficult to perform the sending request and the notification sending. This allows the number of useless sending requests to be reduced. Moreover, it is also effective to set the waiting time duration in accordance with the wireless field intensity when the beacon of the detection object is detected. The weak wireless field intensity results in a high possibility of the beacon loss, so that the long waiting time duration is set.

Although performing the virtual beacon sending by the mobile terminal has been described, the configuration in which the virtual beacon sending is performed with the beacon of the detection object is also possible. In this case, the beacon does not perform the beacon sending as a detection object all the time. In response to a sending request from the mobile terminal, virtual beacon sending is performed for a certain period. The power consumption in the sending is less than that in the reception with such configuration, so that the battery of the beacon lasts longer, compared with a case where the beacon is continuously sent all the time. Moreover, the virtual beacon sending is not requested on the mobile terminal side, so that there is a power saving effect also on the mobile terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication system comprising:
a first wireless device configured to transmit a first signal including first information; a plurality of second wireless devices each of which is configured to receive the first signal and to transmit a second signal including the first information based on the first signal; and
a third wireless device configured to transmit a third signal which requests transmitting of the second signal when third wireless device receives neither the first signal nor the second signal, wherein a second wireless device of the plurality of second wireless devices is configured to transmit the second signal when the third signal is received by the second wireless device from the third wireless device and when the second signal is not received by the third wireless device from another second wireless device of the plurality of second wireless devices, and
the second wireless device is configured not to transmit the second signal even when the third signal is received by the second wireless device from the third wireless device, when the second signal is received by the third wireless device from the another second wireless device.

2. The wireless communication system according to claim 1, wherein
the first wireless device is configured to periodically transmits the first signal, and
each of the second wireless devices is configured to stop transmitting the second signal when receiving of the first signal is stopped.

3. The wireless communication system according to claim 1, wherein after receiving the third signal from the third wireless device, the second wireless device is configured to transmit the received third signal when transmission of the second signal from the another second wireless device to the third wireless device is stopped.

4. The wireless communication system according to claim 1, wherein
the second wireless device is configured to transmit the third signal to the another second wireless device when a first time duration is elapsed after receiving the third signal.

5. The wireless communication system according to claim 4, wherein
the first time duration is set to the second wireless devices respectively.

6. The wireless communication system according to claim 1, wherein
each of the second wireless devices and the third wireless device are mobile wireless terminals.

7. The wireless communication system according to claim 6, wherein
the first wireless device is a beacon, and
the first information is identification information of the beacon.

8. The wireless communication system according to claim 1, wherein
the third wireless device is configured to transmit the third signal when the third wireless device is in a certain region which is registered in advance and receives neither the first signal nor the second signal.

9. A method using a wireless communication system, the method comprising:

transmitting, from a first wireless device, a first signal including first information; receiving the first signal by each of a plurality of second wireless devices;

transmitting, by each of the plurality of second wireless devices, a second signal including the first information based on the first signal;

transmitting, by a third wireless device, a third signal which requests transmitting of the second signal when third wireless device receives neither the first signal nor the second signal; and transmitting, by a second wireless device of the second wireless devices, the second signal when the third signal is received by the second wireless device from the third wireless device and when the second signal is not received by the third wireless device from another second wireless device of the plurality of second wireless devices, and not transmitting, by the second wireless device, the second signal even when the third signal is received by the second wireless device from the third wireless device, when the second signal is received by the third wireless device from the another second wireless device.

10. The method according to claim 9, wherein the first wireless device is configured to periodically transmits the first signal, and the method further comprising:

stopping, by each of the second wireless devices, transmitting the second signal when receiving of the first signal is stopped.

11. The method according to claim 9, further comprising: after receiving the third signal from the third wireless device, transmitting, by the second wireless device, the received third signal when transmission of the second signal from the another second wireless device to the third wireless device is stopped.

12. The method according to claim 9, wherein the second wireless device is configured to transmit the third signal to the another second wireless device when a first time duration is elapsed after receiving the third signal.

13. The method system according to claim 12, wherein the first time duration is set to the second wireless devices respectively.

14. The method according to claim 9, wherein each of the second wireless devices and the third wireless device are mobile wireless terminals.

15. The method according to claim 14, wherein the first wireless device is a beacon, and the first information is identification information of the beacon.

16. The method according to claim 9, wherein the third wireless device is configured to transmit the third signal when the third wireless device is in a certain region which is registered in advance and receives neither the first signal nor the second signal.

* * * * *